United States Patent [19]
Lilja et al.

[11] Patent Number: 5,870,824
[45] Date of Patent: Feb. 16, 1999

[54] METHOD OF REMOVING A FAN SECTION OF A JET ENGINE

[75] Inventors: Gerald D. Lilja, Parker, Colo.; Frank Fowler, Gilford, Conn.; Robert F. Hatch, Aurora, Colo.

[73] Assignee: Stanley Aviation Corporation, Aurora, Colo.

[21] Appl. No.: 880,666

[22] Filed: Jun. 23, 1997

Related U.S. Application Data

[62] Division of Ser. No. 565,385, Nov. 30, 1995.

[51] Int. Cl.$^6$ ..................................................... B23P 15/00
[52] U.S. Cl. ........................................... 29/889.1; 187/244
[58] Field of Search ........................... 29/889.1; 187/244; 244/137.1

[56] References Cited

U.S. PATENT DOCUMENTS

| | | | |
|---|---|---|---|
| 2,594,586 | 4/1952 | Ries | 280/44 |
| 2,613,807 | 10/1952 | Higbee | 206/46 |
| 2,670,166 | 2/1954 | Applegate | 248/119 |
| 2,674,370 | 4/1954 | Iredell, III | 206/46 |
| 2,674,371 | 4/1954 | Blackinton | 206/46 |
| 2,928,535 | 3/1960 | Simmons et al. | 206/46 |
| 2,982,395 | 5/1961 | Rados | 206/46 |
| 3,194,525 | 7/1965 | Webb | 248/119 |
| 3,211,299 | 10/1965 | Metzrath | 214/1 |
| 4,117,927 | 10/1978 | Gothsche | 206/319 |
| 4,451,979 | 6/1984 | Schuster | 29/889.1 |
| 4,660,796 | 4/1987 | Garrec | 248/544 |
| 4,699,337 | 10/1987 | Lewis | 244/137.1 |
| 5,383,652 | 1/1995 | Van Den Berg | 269/17 |
| 5,575,145 | 11/1996 | O'Neill et al. | 29/889.1 |

FOREIGN PATENT DOCUMENTS 86302452.7  2/1986  European Pat. Off. .

OTHER PUBLICATIONS

No. 1: Product information advertisement by applicant Re: Core Engine Module.
No. 2: Product information advertisement by applicant Re: various types of ground support equipment to secure and transport components of a jet aircraft.
No. 3: Product information advertisement by applicant Re: a cradle device for securing components of a jet aircraft engine.
No. 4: Product information advertisement by applicant Re: a cradle device for securing components of a jet aircraft engine.
No. 5: Product information advertisement by applicant Re: Engine Stand.
No. 6: Product information advertisement by applicant Re: Hydraulic Engine Stand.
No. 7: Relevant portions of a product information catalog by Advance Ground Systems Engineering Corporation of Anaheim, California (23 Oct. 1990).

*Primary Examiner*—Irene Cuda
*Attorney, Agent, or Firm*—Fields and Johnson, P.C.

[57] ABSTRACT

A jet aircraft engine transport apparatus utilizes three major subcomponents. The first subcomponent is a shipping stand which enables a jet aircraft engine to be configured for transport in either a truck transport mode or air transport mode. The second subcomponent is a fan dolly which releasably secures the fan section of the jet aircraft engine for transport. The fan dolly serves the dual purpose of enabling removal of the fan section from the jet aircraft engine and providing a means of transport so that the fan section may be transported on the fan dolly or loaded onto a fan shipping frame, the third major subcomponent of the transport apparatus of this invention. The fan shipping frame enables transport of the fan section in either an upright or horizontal position, and further provides for a fan storage container for securing the fan blades of the fan section.

3 Claims, 28 Drawing Sheets

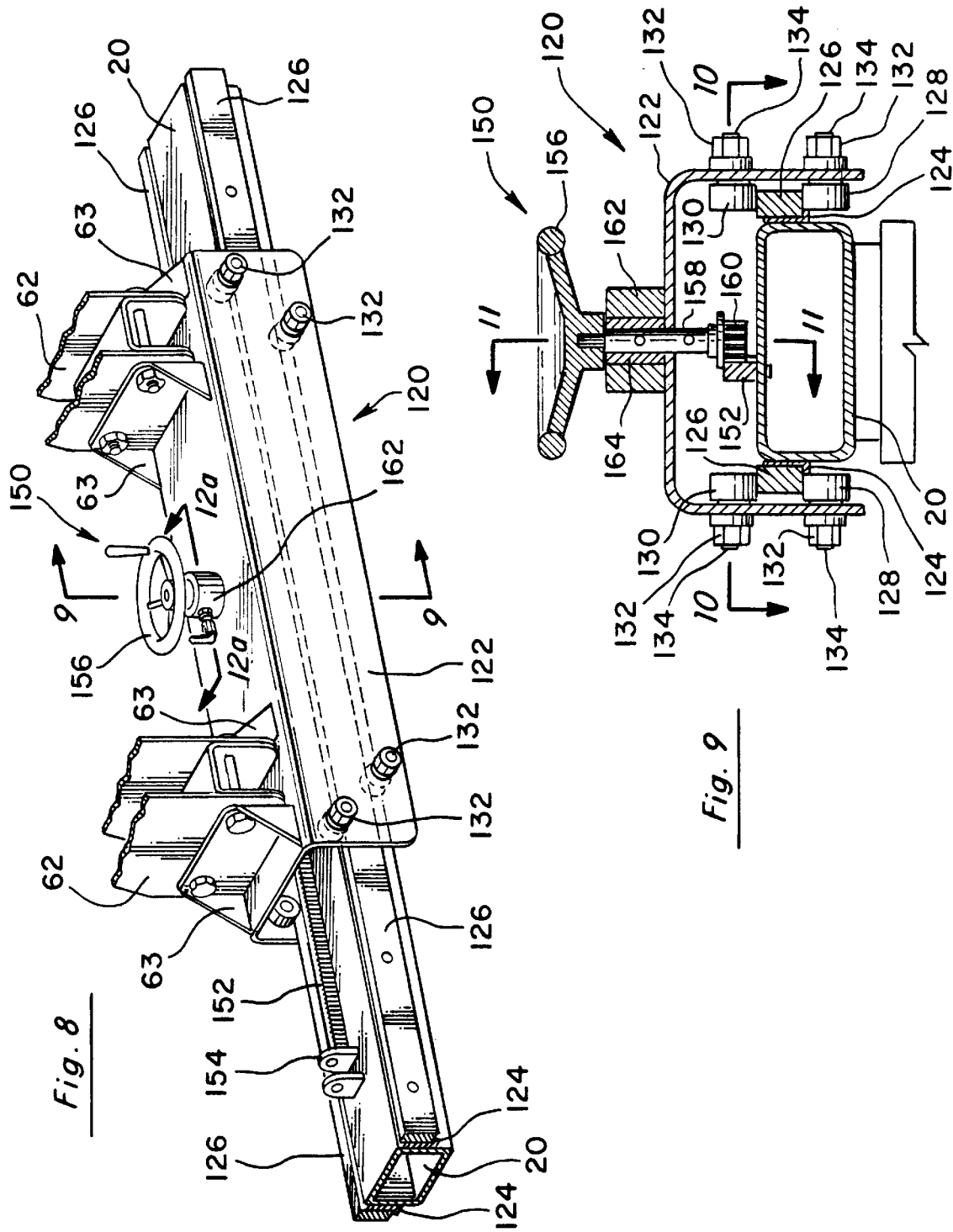

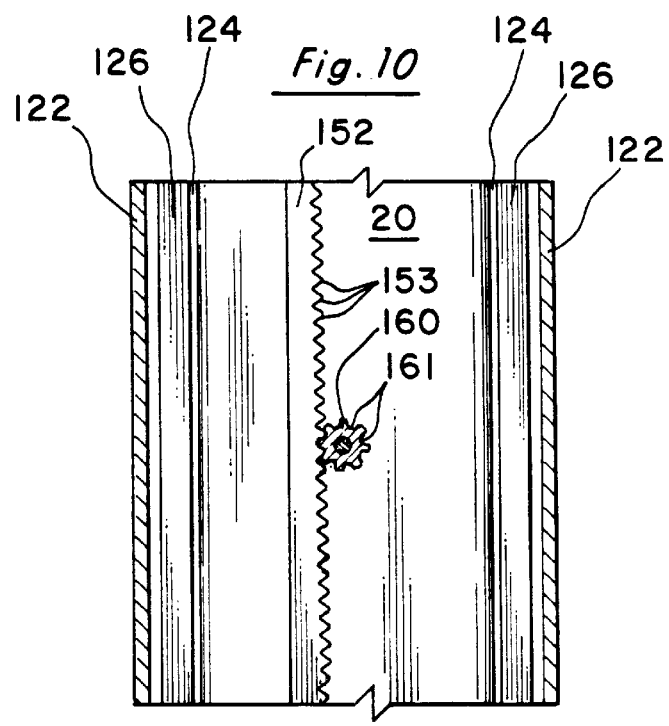
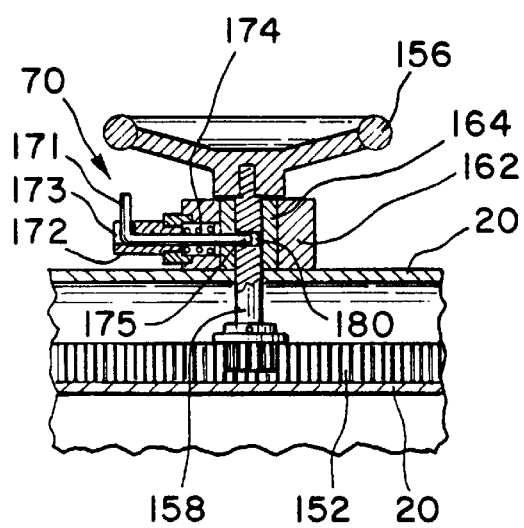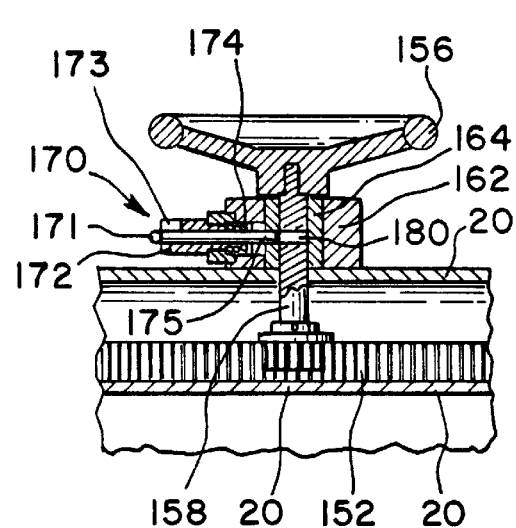

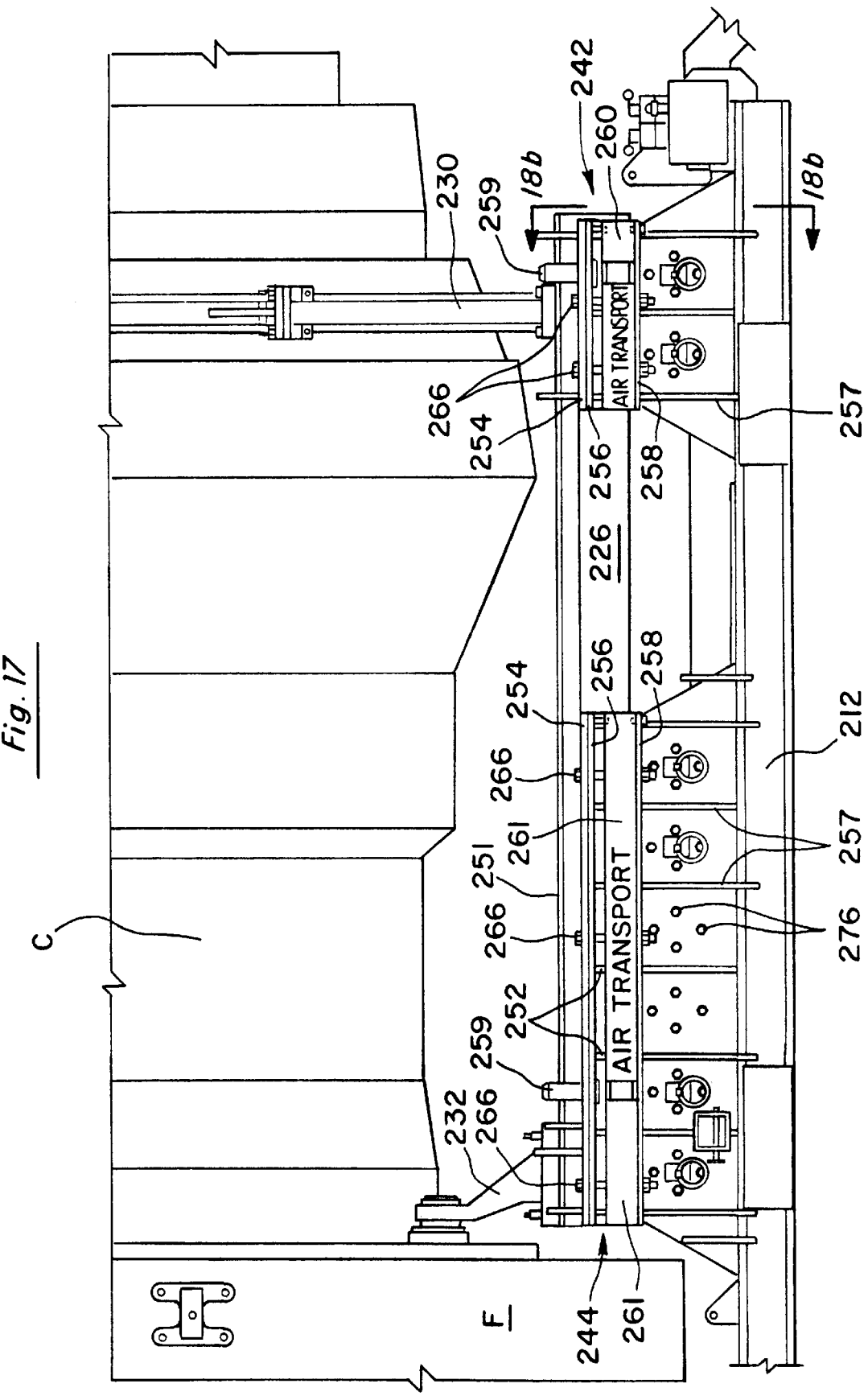

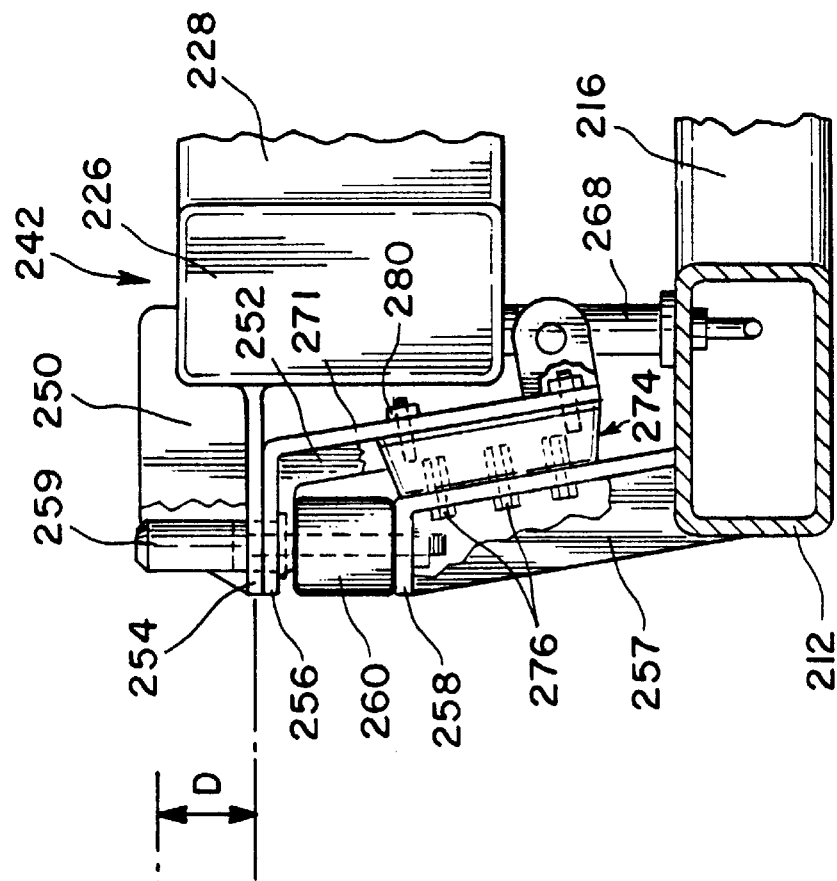
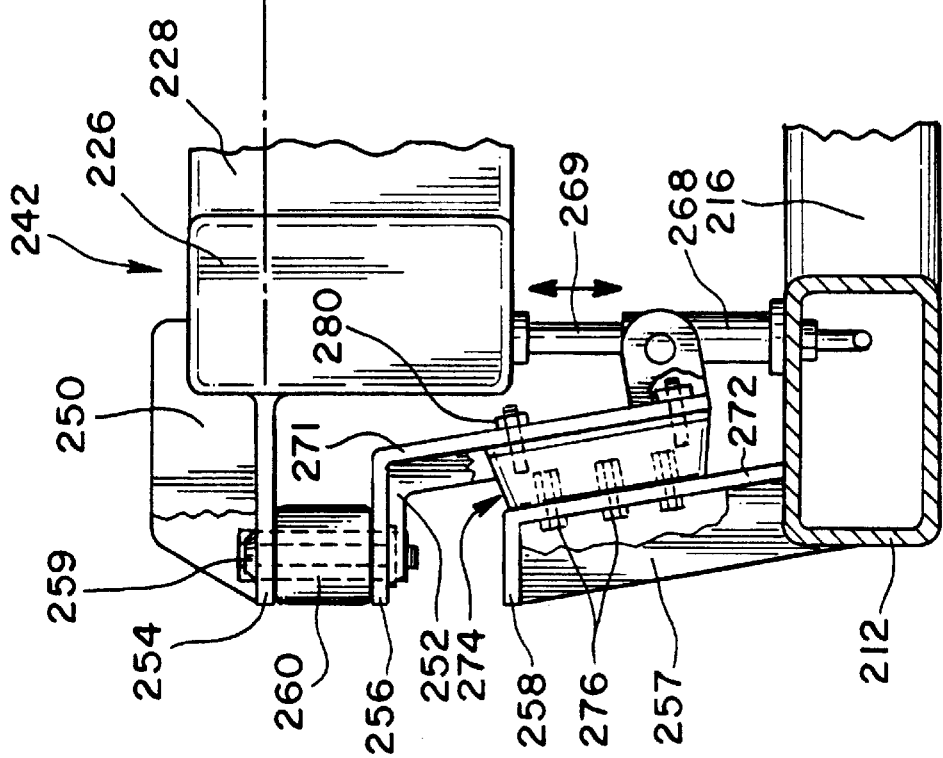

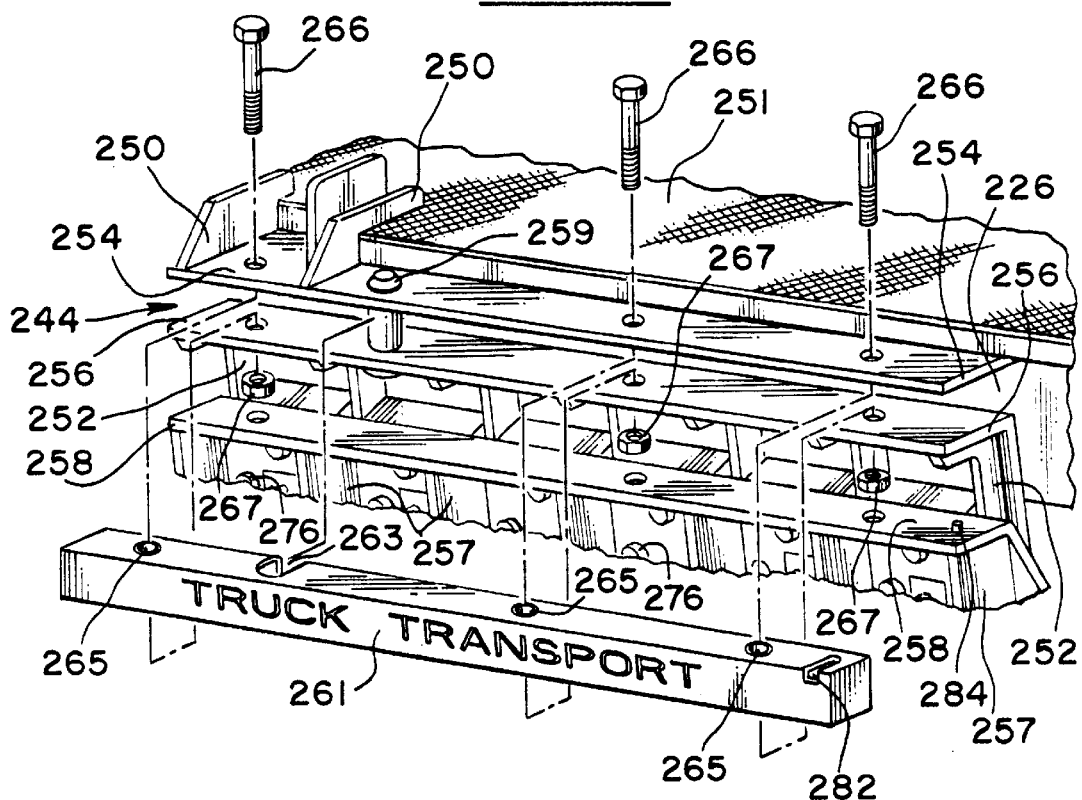
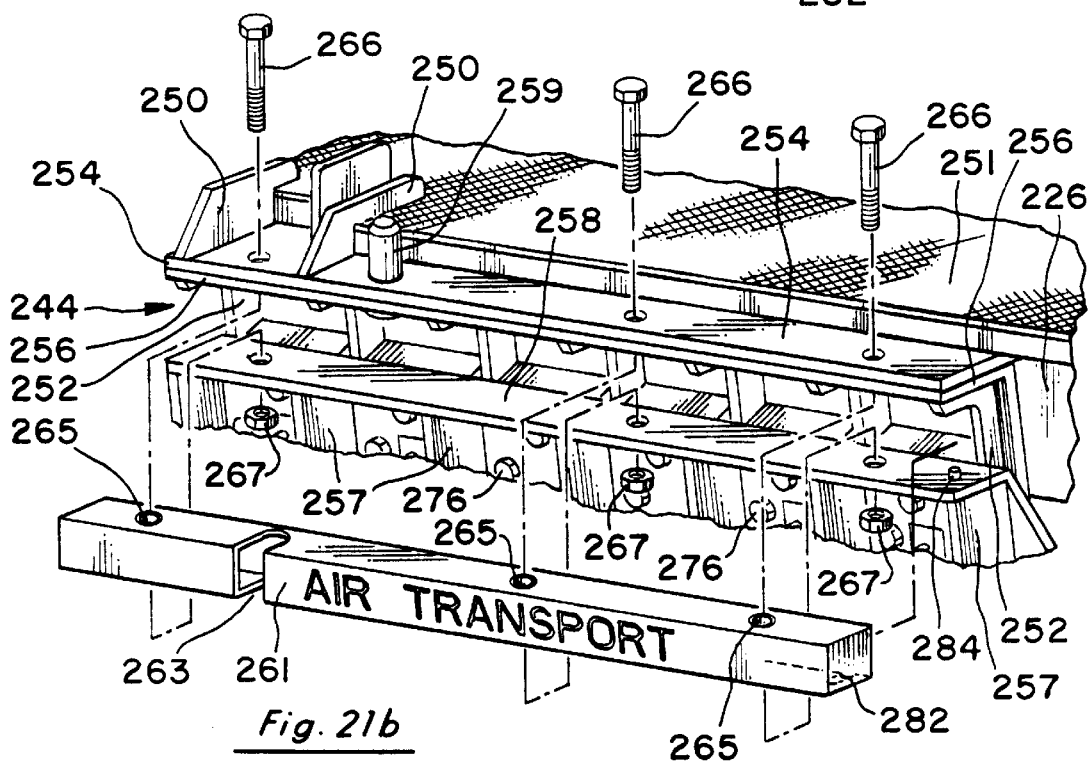

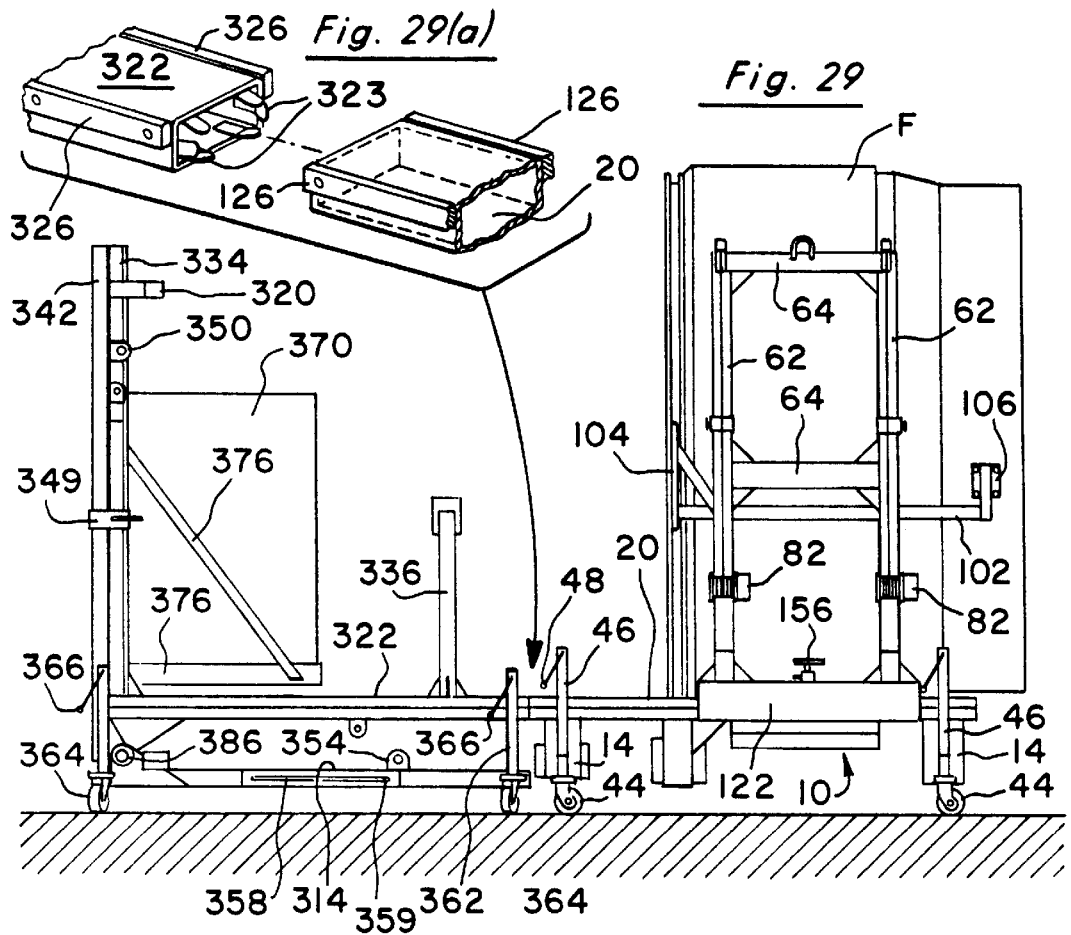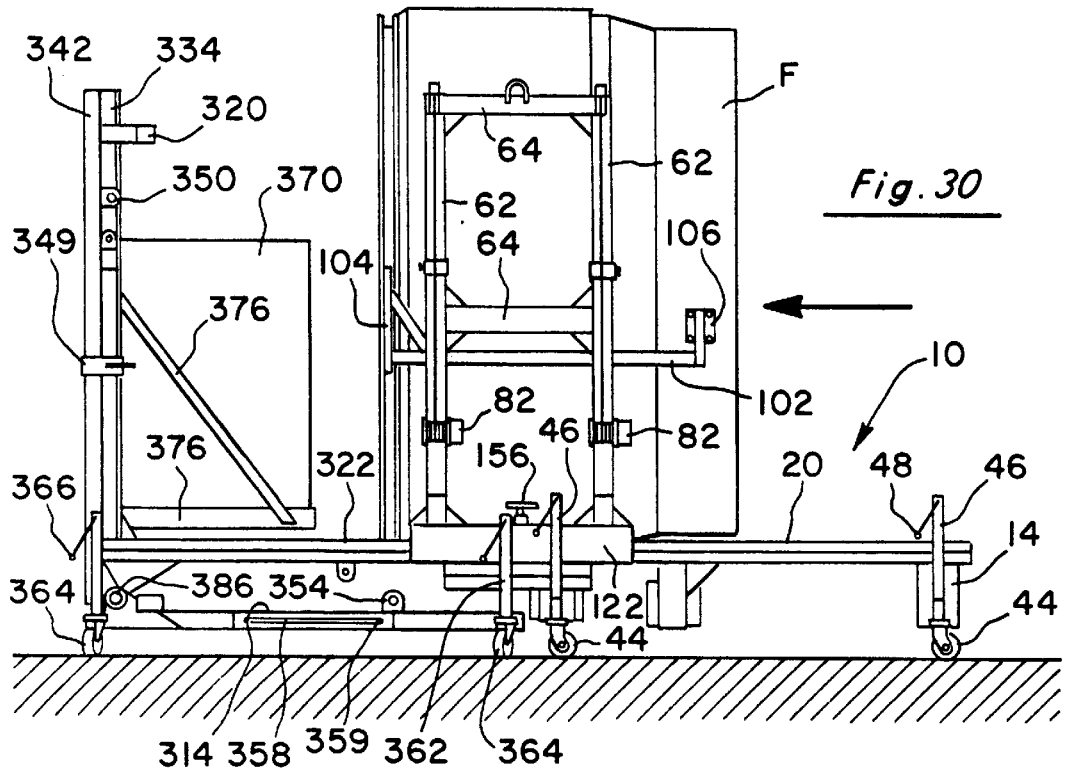

METHOD OF REMOVING A FAN SECTION OF A JET ENGINE

This application is a division of application Ser. No. 08/565,385, filed Nov. 30, 1995.

TECHNICAL FIELD

This invention relates to a apparatus providing a means of transport for an object and, more particularly, to a jet aircraft engine transport apparatus for transport of jet aircraft engine components.

BACKGROUND ART

In the commercial aircraft industry, a need has developed for the capability of transporting aircraft engine components in order that these components may be repaired or retrofitted. Jet aircraft engines are perhaps the most critical assembly of an aircraft wherein the engines must be inspected and maintained to the highest level of repair. Periodically, it is necessary to remove these engines from the wing or fuselage of the aircraft so that the aircraft engine can undergo the necessary repairs. There are three major component sections of the jet aircraft engine, namely, the inlet cowl, the fan section and the core section. When the fan section is removed from the core section, this is known in the art as "engine splitting." The fan section may be removed from the core section either when the entire jet aircraft engine has been removed from the aircraft or some circumstances dictate that only the fan section be removed while the core section remain attached to the aircraft.

Some prior art devices exist for securing and transporting jet aircraft engine components that have been removed from an aircraft. Typically, these prior art devices include a number of different configurations which releasably secure the jet aircraft engine components and provide a means for moving the components so that the components may be transported to a desired location for the needed repairs or inspections.

Although the prior art devices may be adequate for their intended purposes, one significant shortfall is that none of the prior art devices provide a complete transport apparatus comprising a group of devices which are compatible with one another such that the major components of the jet aircraft engine may be secured and transported in the desired mode of transport. Furthermore, the prior art does not provide for a transport apparatus which enables aircraft engine components to be transported on differing types of aircraft and wheeled vehicles without having to use a series of complex equipment. Thus, one major advantage of the invention disclosed herein is its ability to accommodate differing aircraft engines for both air and land transport.

DISCLOSURE OF THE INVENTION

Jet Aircraft Engine Transport Apparatus

In the most broad disclosure of the invention, a jet aircraft engine transport apparatus is disclosed which utilizes three major subcomponents. The first subcomponent is a shipping stand which enables a jet aircraft engine to be configured for transport in either a truck transport mode or air transport mode. The second subcomponent is a fan dolly which releasably secures the fan section and inlet cowl of the jet aircraft engine. The fan dolly serves the dual purpose of enabling precise removal of the fan section from the core section and provides a means of transport so that the fan section may be loaded onto a fan shipping frame. The third major subcomponent of the transport apparatus is the fan shipping frame which enables the transport of the fan section in either an upright or horizontal position.

A. Jet Aircraft Engine Fan Dolly

The fan dolly subcomponent of this invention utilizes a novel attachment assembly which measures the load placed on the fan dolly from a loaded fan section and inlet cowl, incorporates a novel train assembly which enables the fan section to be removed from the core section of a jet aircraft engine, and enables the fan section to be directly loaded onto the shipping stand. During engine splitting operations such as the removal of the fan section from the core section, it is critical that there be minimal vertical deflection of the fan section when pulled away from the core section. Minimal deflection is essential because the bolts which secure the fan section to the core section can become damaged or the template on the fan section which engages with the bolts can also become damaged. Accordingly, the attachment assembly includes a plurality of load indicating devices, such as dynamometers, which indicate the load placed upon the attachment assembly by a loaded fan section and inlet cowl. A cable ratchet assembly is provided to adjust the amount of load placed upon the attachment assembly at specific locations.

Structurally, the fan dolly includes a frame assembly which has mounted upon it a pair of train assemblies. A plurality of caster assemblies are also mounted to the frame assembly and which provide locomotive capability to the fan dolly. Means are provided within the caster assemblies to raise or lower the fan dolly enabling it to cooperate with the shipping stand, shipping frame or particular aircraft from which the fan section is to be removed or onto which it is to be loaded. A fan support assembly is mounted on each of the train assemblies which releasably secures the fan section to the fan dolly. A traversing assembly of each of the train assemblies enables a loaded fan section to be displaced along the fan dolly in precise horizontal increments so that the fan section may be positioned for removal from the core section of the jet aircraft engine or positioned for loading onto the shipping stand or shipping frame.

When the fan dolly receives a fan section and cowl from a jet aircraft engine that is loaded on a device such as the shipping stand of this invention, the attachment assemblies and train assemblies can compensate for any vertical deflection of the shipping stand as the fan section and cowl are removed from the core section. That is, as the fan section and inlet cowl are removed from the core section which is still secured to the shipping stand, the shock absorbers of the shipping stand (described below) will have a tendency to deflect to a less loaded condition which in turn will deflect the core section in relation to the fan section. This deflection of the shock absorbers can be compensated for by the attachment assemblies and train assemblies.

If the entire jet aircraft engine has already been removed from the aircraft, the fan dolly is also compatible with a number of commercial engine shop pedestals so the fan section can be removed from the core section to undergo repairs. Furthermore, the fan dolly of this invention has advantages over prior art devices which utilize conventional cradle and shock absorbing components, and which have inherent deflection problems during engine splitting operations. Also, the fan dolly of this invention enables engine splitting and fan section transport with a minimum of equipment and manpower.

B. Jet Aircraft Engine Shipping Stand

The shipping stand subcomponent of the transport apparatus utilizes spacer elements which may be positioned in a truck transport mode wherein a plurality of shock absorbers are activated to provide shock absorbing support to a loaded aircraft engine, alternatively, the shipping stand may be positioned in an air transport mode wherein the spacers are stowed and the shock absorbers are deactivated. The spacers are positionable in either desired mode by the use of an integral hydraulic system which raises and lowers a cradle assembly which supports the mounted engine. The advantage of such a dual mode system is based on the need to transport a jet aircraft engine on land via a wheeled vehicle and/or on the main deck of a Boeing 747 or other jet aircraft for further destinations. In the truck transport mode, the shock absorbers are required to provide shock protection to the mounted jet aircraft engine from the impacts associated with road travel. Without such protection, the jet engine could be easily damaged during transport. However, in the air transport mode, the shock absorbers are not required. This is due to the fact that air transport is a much smoother means of transport wherein the natural flight of the aircraft generally provides adequate shock absorbing protection.

Conveniently, when the shipping stand is placed in the air transport mode, the height of an aircraft engine loaded thereon is lowered enabling the loaded aircraft engine to fit through the cargo door of commercial aircraft such as a Boeing 747. More specifically, the dimensions of a Boeing 747 side cargo door provide only a one and one-half inch (1½") clearance when the fan section of a Boeing 777 jet aircraft engine is loaded through the cargo door. Thus, it is necessary that the jet aircraft engine be precisely aligned with the cargo door so that the jet aircraft engine may be easily loaded. With the dual mode capability the present invention, the shipping stand may be lowered from the truck transport to the air transport mode at an ideal height which enables the jet aircraft engine to be directly loaded through the cargo door while the jet aircraft engine remains secured to the shipping stand.

The structure of the shipping stand includes a frame assembly including a plurality of frame members which provide adequate support to a cradle assembly which cradles or secures a jet aircraft engine. Mounted to the frame assembly are wheels which enable the shipping stand to be pulled by a vehicle. The plurality of shock absorbers are operatively engaged between the frame assembly and cradle assembly to provide adequate shock protection to the jet aircraft engine when the shipping stand is in the truck transport mode. To enable the shipping stand to be selectively placed in either the truck transport or air transport mode, lifting mechanisms are provided to lower or raise the cradle assembly corresponding to the desired mode. In the truck transport mode, the lifting mechanisms raise the cradle assembly to a predetermined height which creates gaps between upper transport flanges and lower transport flanges. These gaps correspond to the height of spacers which are positionable between the upper and lower flanges. Once the spacers are positioned between the flanges, the lifting mechanisms are deactivated which causes the shock absorbers to bear the weight of the loaded aircraft engine. If it is desired to load a jet aircraft engine onto an aircraft, the shipping stand may be placed in the air transport mode. This is achieved by activating the lift mechanisms, removing the spacers between the transport flanges and then lowering the cradle assembly so that the gaps between the transport flanges are eliminated. In the air transport mode, the spacers are stowed on the shipping stand by use of storage support flanges positioned adjacent the transport flanges.

Each spacer includes indicia which indicates which mode the shipping stand is configured. More specifically, each spacer includes a plurality of mode slots which cooperate with corresponding mode pins formed on the upper and lower transport flanges. The cooperation of the mode slots with the mode pins results in the appropriate indicia appearing on the side of the spacer exposed to viewing. Thus, the indicia serves to ensure that an operator of the shipping stand does not inadvertently place the shipping stand in the inappropriate mode when transporting the jet aircraft engine.

Although the shipping stand is described as having particular utility with respect to transport of a Boeing 777 jet aircraft engine by use of a Boeing 747 aircraft, it will be understood that the present invention is intended for many other uses as it is easily adaptable to accommodate the transport of many different types of jet aircraft engines for truck transport and air transport on numerous different types of aircraft. The height of the cradle assembly in the truck transport mode and the air transport mode may be altered so that a particular jet aircraft engine may be loaded directly onto a specific type of aircraft. For example, for aircraft other than a Boeing 747, the cradle assembly may be raised or lowered in the truck transport mode by altering the specific construction of the frame assembly or cradle assembly. Additionally, any number of different sized spacers may be used to enable a smooth transition from the truck transport mode to the air transport mode and vice versa. Accordingly, the ranges of the lifting mechanisms may also be altered to accommodate the specific height necessary for transition between the two modes.

With the shipping stand just described, it is possible to provide a dual mode of transport for a jet aircraft engine loaded thereon. The shipping stand therefore enables direct loading of an aircraft engine onto an aircraft by changing the configuration from a truck transport to an air transport mode and, conversely, enables a smooth transition from an air transport mode back to a truck transport mode once the jet aircraft engine has arrived at its destination. Accordingly, the shipping stand prevents having to use complicated winch assemblies or other means to load and unload the jet aircraft engine onto and from the aircraft. Additionally, because of the smooth transition between truck and air transport, the chances of damaging a jet aircraft engine during transport is greatly reduced. Furthermore, the process of transporting a jet aircraft engine can be accomplished in a much more cost effective and efficient manner by utilizing the shipping stand of this invention.

C. Fan Shipping Frame

The fan shipping frame subcomponent of this invention is used when the fan section of a jet aircraft engine needs to be transported by itself. By use of the foregoing described fan dolly, the fan section may be loaded directly upon the shipping frame. By use of the shipping frame, a fan section may be transported in either an upright position, or it may be tilted ninety degrees (90°) so that the fan section is positioned on its end in a horizontal position. Transporting the fan section in the upright mode is acceptable when shipping the fan section by means of, for example, a Boeing 747 jet aircraft or on a truck. However, if the fan section of a Boeing 777 aircraft is to be transported, for example, by a C130 cargo aircraft, the fan section must be positioned on its A-flange or end because the rear cargo hatch of the C130 aircraft is too small to accept a vertically positioned Boeing 777 fan section.

Structurally, the shipping frame includes a frame assembly for supporting a loaded fan section. As with the fan dolly device, the fan shipping frame includes a plurality of caster assemblies which provide locomotive capability to the fan shipping frame. A plurality of jack mechanisms attached to the frame assembly enable the shipping frame to be positioned at a desirable height so the fan section may be loaded onto the appropriate aircraft or vehicle. As will be further explained below, rail members mounted on the frame assembly are alignable with rail members on the fan dolly so that the fan section may be directly transferred onto the shipping frame. Once the fan section is transferred to the shipping frame, the fan section is secured thereon by means of a template bracket which aligns with the attaching ring of the fan section. If it is necessary to tilt the fan section ninety degrees (90°) to the horizontal for transport, a novel platform assembly is deployed enabling the fan section to be tilted without the aid of external equipment. Mounted on the fan shipping frame is a storage container which may receive and store the fan blades of the fan section in either the upright or the tilted mode. The storage container includes a plurality of storage cells which have unique curved shapes which match the shape of the fan blades.

Additional advantages of this invention will become apparent from the description that follows, taken in conjunction with the accompanying drawings.

BRIEF DESCRIPTION OF THE DRAWINGS

FIG. 8 is an enlarged fragmentary perspective view of a train assembly of the fan dolly of this invention;

FIG. 9 is a vertical section, taken along line 9—9 of FIG. 8, showing the traversing assembly of the fan dolly of this invention;

FIG. 10 is an enlarged fragmentary plan view, taken along line 10—10 of FIG. 9, showing the engagement of a pinon with a rack of gears of the traversing assembly;

FIG. 11a is an enlarged fragmentary vertical section, taken along line 11—11 of FIG. 9, illustrating the train assembly in the engaged and locked mode;

FIG. 11b is an enlarged fragmentary vertical section, taken along line 11—11 of FIG. 9, illustrating the train assembly in the engaged and unlocked mode;

FIG. 17 is an enlarged fragmentary side elevation, as shown in FIG. 15, but illustrating the shipping stand configured in the air transport mode;

FIG. 18a is an enlarged fragmentary vertical section taken along line 18a of FIG. 16;

FIG. 18b is an enlarged fragmentary vertical section taken along line 18b of FIG. 17;

FIG. 21a is an enlarged partially exploded fragmentary perspective view of a forward spacer that is engageable with the cradle assembly of the shipping stand of this invention configured in the truck transport mode;

FIG. 21b is an enlarged partially exploded fragmentary perspective view of a forward spacer that is engageable with the cradle assembly of the shipping stand of this invention configured in the air transport mode;

FIG. 29 is a side elevation of the fan dolly of this invention connected to the fan shipping frame of this invention wherein the fan section is mounted on the fan dolly;

FIG. 29a is an enlarged fragmentary exploded perspective view of the connection between the fan dolly and fan shipping frame;

FIG. 30 is a side elevation, as shown in FIG. 29, illustrating the fan section being transferred from the fan dolly to the fan shipping frame;

BEST MODE FOR CARRYING OUT THE INVENTION

Jet Aircraft Engine Transport Apparatus

Figure 1:
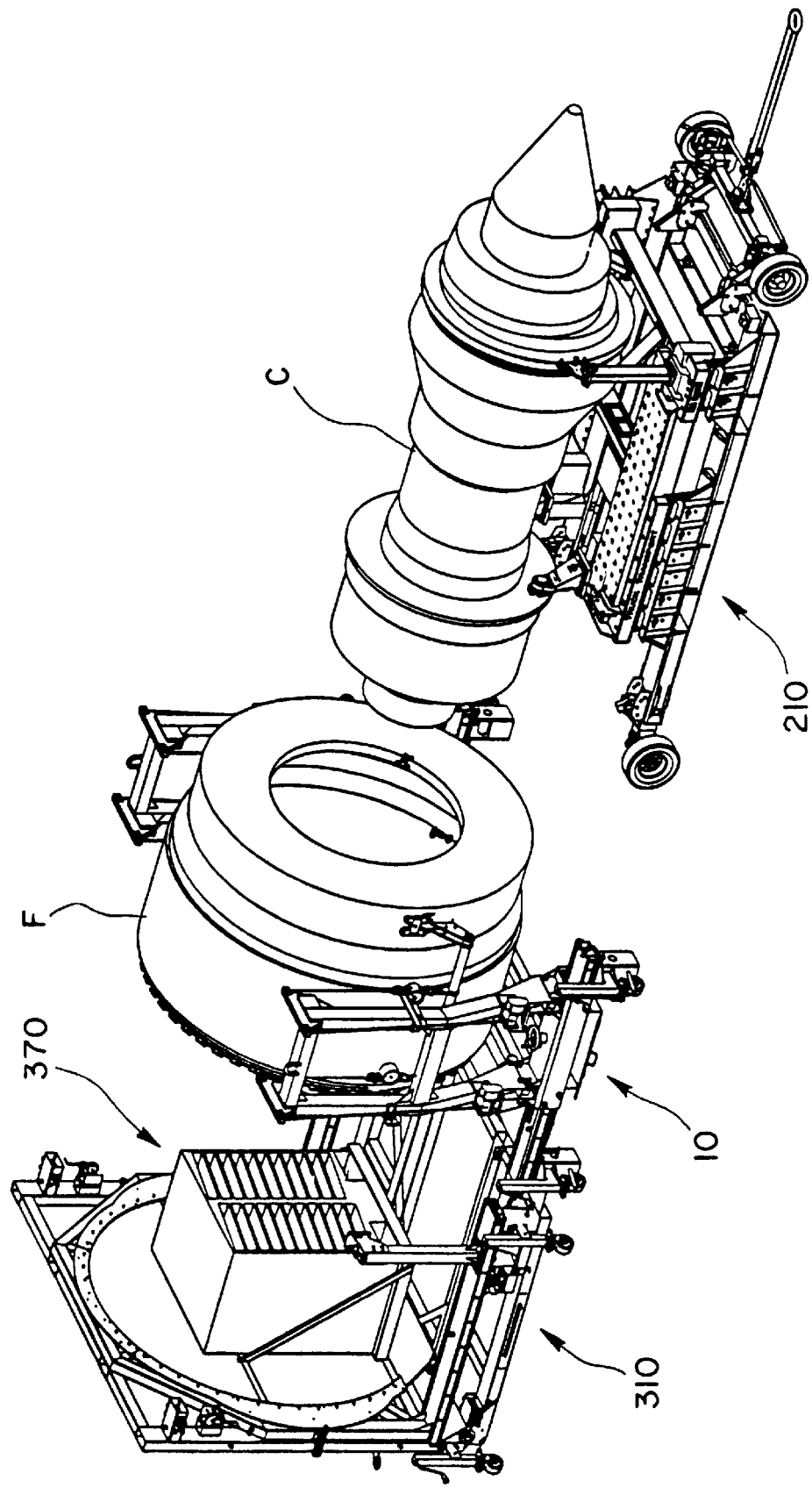
FIG. 1 is a perspective view of a preferred embodiment of the transport apparatus of this invention illustrating the core section of a jet aircraft engine mounted on the shipping stand of this invention, the fan section of a jet aircraft engine mounted on the fan dolly of this invention, and the fan shipping frame with storage container coupled to the fan dolly for receiving the fan section from the fan dolly.
Figure 2:
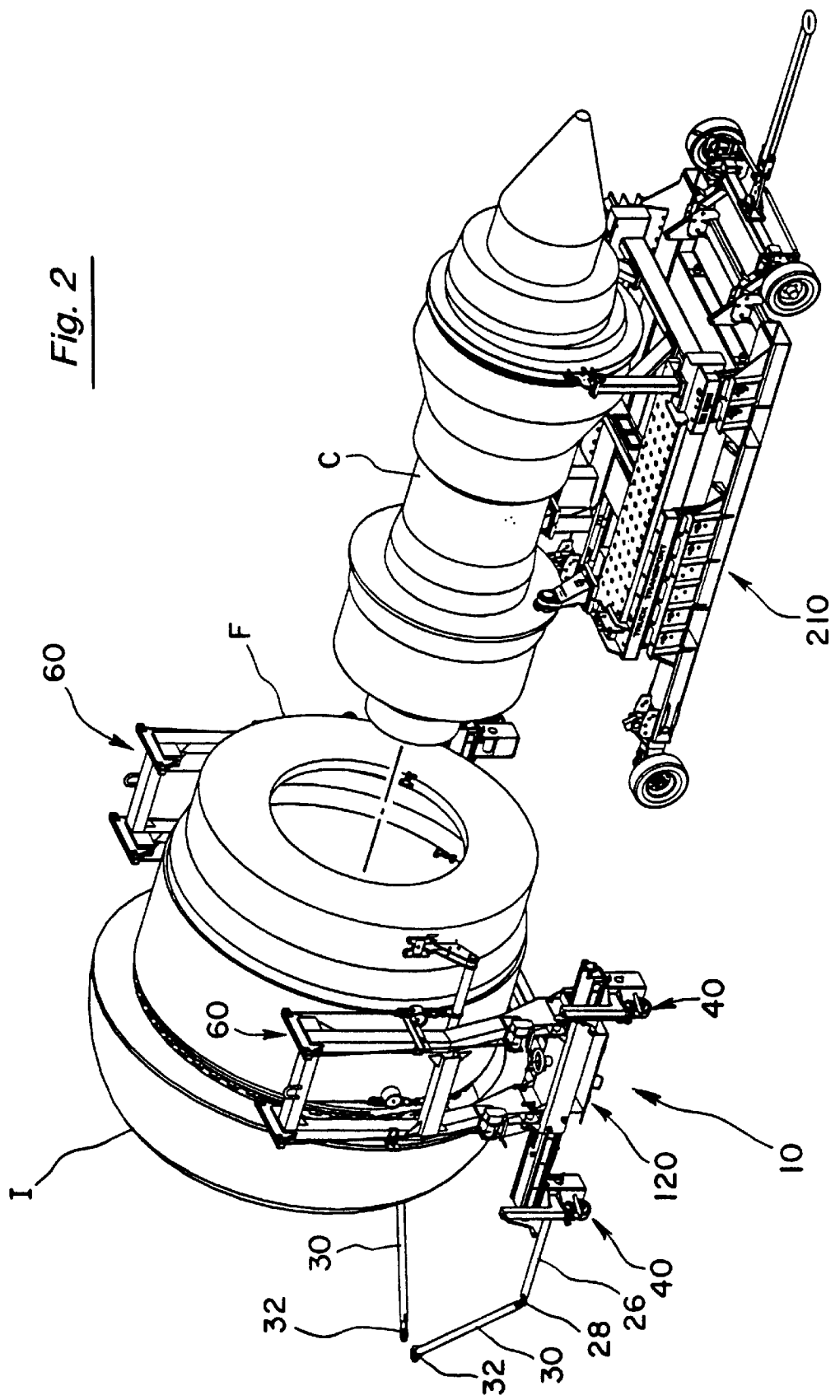
FIG. 2 is a perspective view of a preferred embodiment of the fan dolly of this invention illustrating the fan section and inlet cowl mounted on the fan dolly wherein the fan section has been removed from the core section, the core section shown mounted on the shipping stand of this invention.
Figure 3:
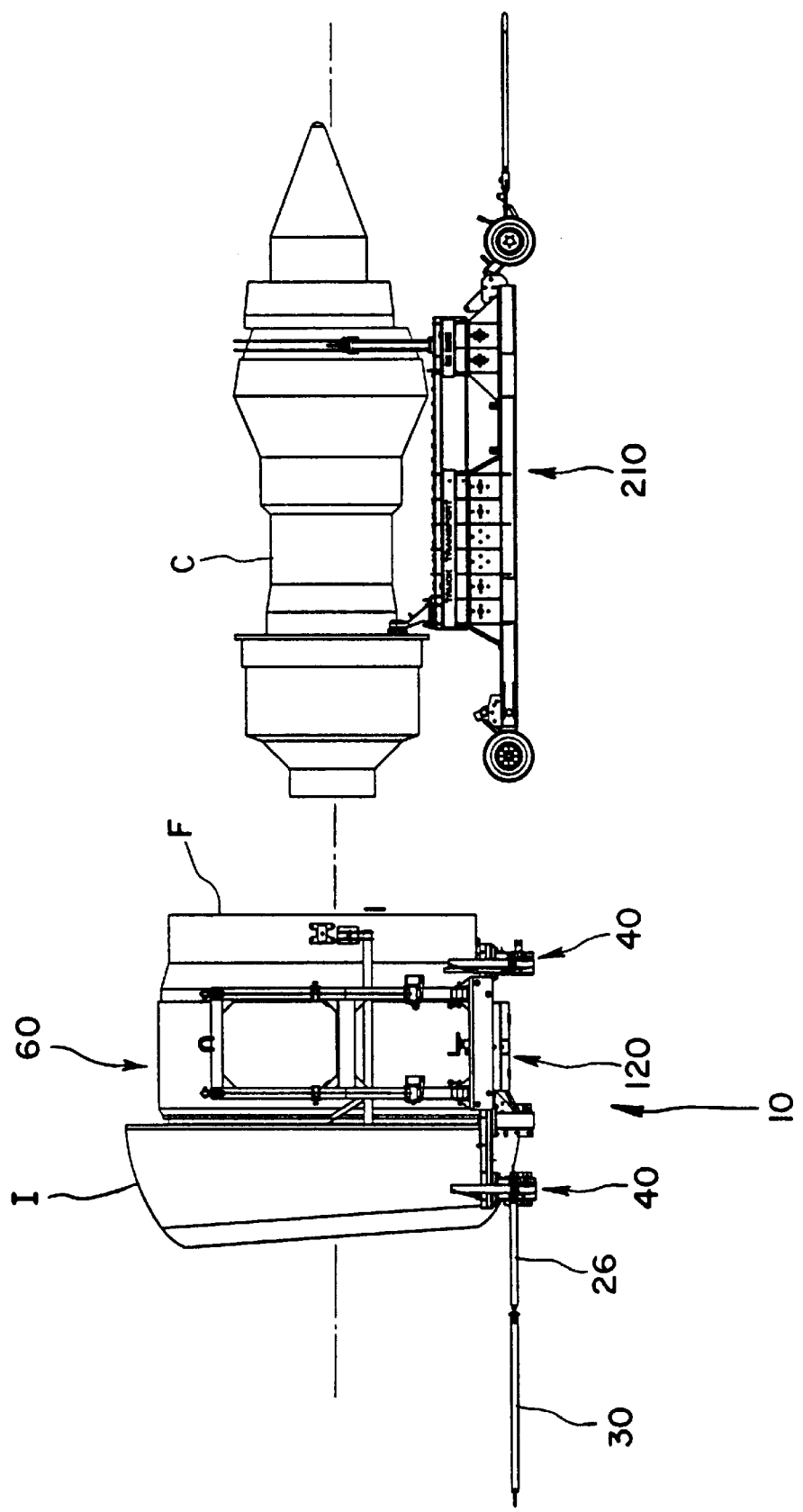
FIG. 3 is a side elevation of the fan dolly and shipping stand of this invention as shown in FIG. 2.
Figure 13:
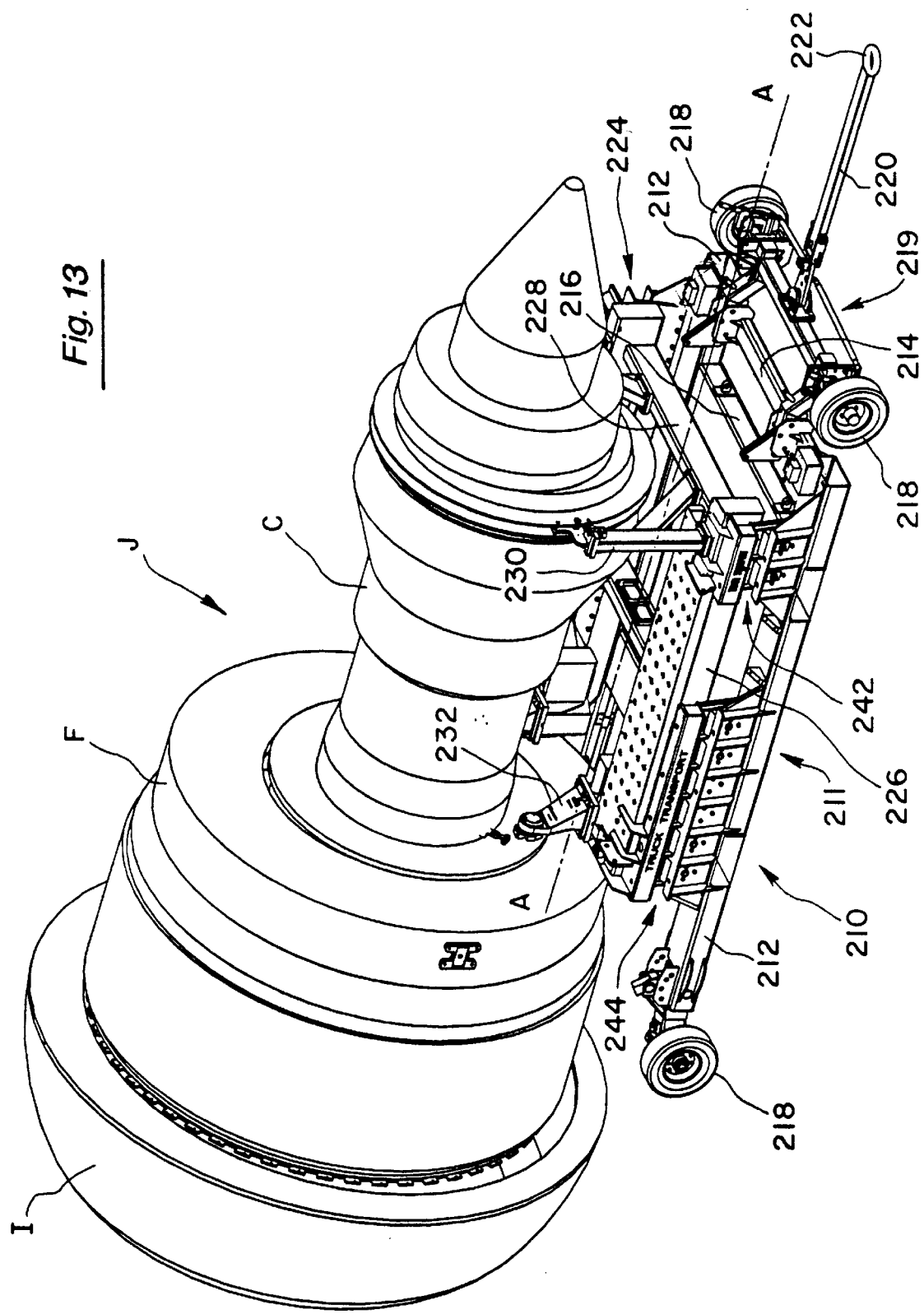
FIG. 13 is a perspective view of a preferred embodiment of the shipping stand of this invention illustrating a jet aircraft engine mounted on the shipping stand while the shipping stand is configured in the truck transport mode.

In accordance with this invention, as best seen in FIG. 1, the jet aircraft engine transport apparatus of this invention includes three major subcomponents. Namely, the transport apparatus comprises a fan dolly 10, a shipping stand 210, and a fan shipping frame 310. As illustrated, the fan section F of the jet aircraft engine has been removed from the core section C of the jet aircraft engine. Accordingly, the core section C is shown mounted on the shipping stand 210 while the fan section F is shown mounted upon the fan dolly 10. The fan dolly 10 is shown as being coupled to fan shipping frame 310 wherein the fan section F may be directly transferred to the fan shipping frame, as will be further discussed below. Prior to mounting the fan section F onto the shipping frame 310 from the fan dolly 10, the inlet cowl I is removed. Although the fan section F is illustrated as being separated from the core section C in FIGS. 1 through 4, it will be understood that the fan section F may remain attached to the core section and, therefore, the entire jet aircraft engine may be shipped or transported solely on the shipping stand 210. This configuration of transport is best seen in FIG. 13 wherein the core section C is shown as being attached to the fan section F.

In operation, the shipping stand 210 may be aligned with a jet aircraft engine that is still attached to the wing or fuselage of an aircraft or may be aligned with a jet aircraft engine that has already been removed from the aircraft. Once aligned, the inlet cowl, core section C and fan section F or only the core section C of the jet aircraft engine is secured to the shipping stand. If the loaded jet aircraft engine sections are to be transported by ground, the shipping stand is configured in a truck transport mode which provides shock absorbing support to prevent damage to the loaded section(s). If the loaded jet aircraft engine sections are to be transported by air, the shipping stand is configured in an air transport mode wherein the loaded shipping stand may be directly loaded onto an aircraft.

If the fan section F of the jet aircraft engine is to be removed from the core section C, the fan dolly 10 serves not only to support the fan section F and inlet cowl I, but also to prepare the fan section for loading upon the shipping frame 310. Thus, in operation, the fan dolly 10 of this invention may be aligned for receiving the fan section F of a jet aircraft engine when the jet aircraft engine is either mounted to the aircraft or when the entire jet aircraft engine has been removed from the aircraft. In either instance, once aligned, the fan dolly secures the fan section and enables it to be transported via ground transportation, allows it to be transferred to the shipping frame 310 or received from the shipping stand 210. Prior to loading the fan section onto the shipping frame, the inlet cowl I is removed and stored at a remote location. When the fan section F is transferred to the shipping frame 310, a pair of rail members on the fan dolly 10 mate with rail members on the shipping frame 310 enabling the fan section F to be directly transferred to the shipping frame without the necessity of external equipment.

Once the fan section F is loaded on the shipping frame 310, it may be secured to the shipping frame by means of a template 332 which cooperates with a plurality of holes 109 on the fan section F. Mounted on the shipping frame 310 may be a fan blade storage container 370 which enables the fan blades of the fan section to be stored and transported on the shipping frame.

When initially loaded on the shipping frame 310, the fan section F is in an upright or vertical transport position. Because of the size of the cargo doors on some aircraft, such as a C130 cargo aircraft, it may be necessary to tilt or tip the fan section ninety degrees (90°) in order that it may be loaded on the aircraft and transported. Accordingly, the shipping frame 310 may be tilted or tipped such that the fan section F is placed in a horizontal position.

A. Jet Aircraft Engine Fan Dolly

Figure 4:
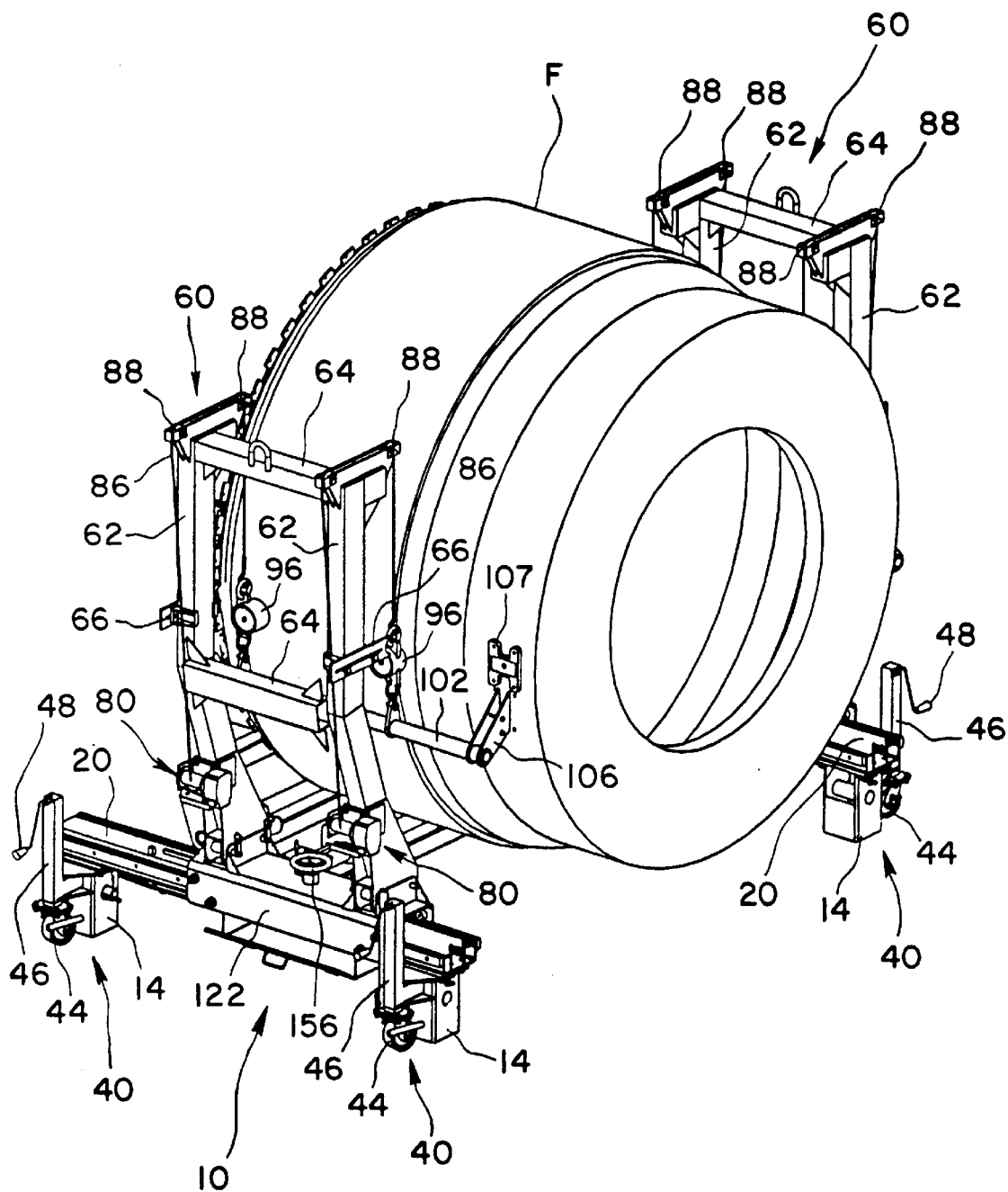
FIG. 4 is an enlarged perspective view of one side of the fan dolly of this invention with the fan section loaded thereon.
Figure 5:
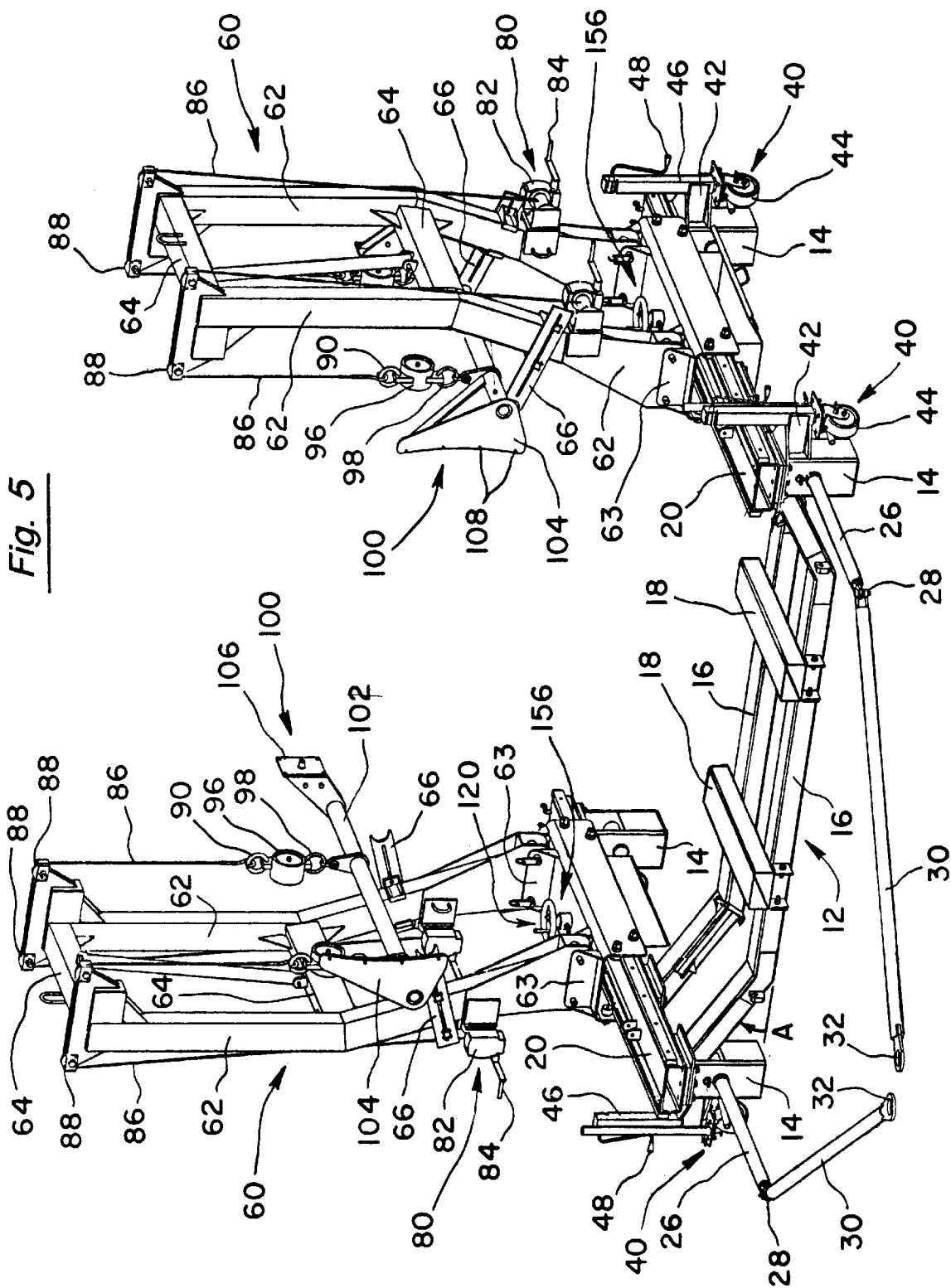
FIG. 5 is an enlarged perspective view of the opposite side of the fan dolly of this invention wherein the fan section has been removed.

As best seen in FIGS. 2 through 5, the fan dolly 10 has mounted upon it the fan section F of a jet aircraft engine. The fan dolly comprises a frame assembly 12 which includes a plurality of cross members 16 which are attached in a perpendicular fashion to longitudinal members 18. The combination of the cross members 16 and longitudinal members 18 resemble an H frame configuration. As illustrated in FIG. 5, the ends of each cross member 16 are upturned at a specified angle A. Attached to the upturned end portions of cross members 16 are pylons 14. Pylons 14 serve as base supports for the fan dolly 10 wherein there is a clearance between the ground level and cross members 16. Mounted on cross members 16 and pylons 14 are a pair of rail members 20 which extend substantially parallel with longitudinal members 18. The attachment of the foregoing structural elements may be achieved as by welding, or by an appropriate nut and bolt combination.

In order that the fan dolly may be transported to the desired location, rigid extensions 26 are provided which connect to opposing pylons 14. The free ends of rigid extensions 26 include joints 28 which in turn connect to moveable extensions 30. The free ends of moveable extensions 30 include pintles 32 which may be attached to the hitch of a vehicle for towing the fan dolly 10. The hinges 28 enable the fan dolly to be towed by different types of vehicles which may have trailer hitches which are positioned at different heights.

Connected to the exterior sides of pylons 14 are caster assemblies 40. Caster assemblies serve the dual purpose of providing not only locomotive capability to fan dolly 10, but also enable the fan dolly to be positioned at the appropriate height when the fan dolly is engaged with the shipping stand 210, shipping frame 310, or a fan section which has not been removed from an aircraft. Caster assemblies 40 may be attached as by attachment flanges 42 to pylons 14. The lower end of each assembly 40 includes a wheel or caster 44. The height of the fan dolly is controlled by means of jacks 46 and corresponding hand cranks 48 which raise or lower the corresponding wheel 44. Each of the hand cranks 48 are synchronized with one another such that the same degree of rotation of each hand crank results in the same vertical displacement of wheels 44.

As best seen in FIGS. 8 and 9, mounted on each rail member 20 is a corresponding train assembly 120. The functioning and makeup of train assembly 120 will be further discussed below. Mounted on each train assembly 120 is a fan support assembly 60. As best seen in the preferred embodiment in FIGS. 5 and 7, each fan support assembly 60 includes a pair of vertically extending stanchions 62. Stanchions 62 may be mounted on train assemblies 120 via base flanges 63 as by a nut and bolt combination or as by welding. Stanchions 62 may be rotatably pinned to base flanges 63 which enables the stanchions 62 to be positioned horizontally for storage or transport of the fan dolly when not carrying a loaded aircraft engine component. To provide the needed lateral stability, cross members 64 are provided which attach to stanchions 62. Connected to the lower portion of each stanchion 62 is a corresponding stabilizer 66. Stabilizers 66 cooperate with attachment rods 102, as will be further discussed below. The position of stabilizer 66 may be controlled by sliding stabilizer 66 along its adjustment slot 68 and then tightening adjustment retainer 70 when the stabilizer is in the desired position.

As shown in FIG. 5, a cable ratchet assembly 80 is connected to each of the stanchions 62 adjacent the locations of stabilizers 66. Each ratchet assembly 80 includes a ratchet mechanism 82 that controls the length of corresponding cable 86 which extends from the ratchet mechanism 82. Control of cable 86 is achieved by a hand crank 84 which cooperates with the ratchet mechanism 82. As understood in the art, ratchet mechanism 82 allows the length of cable 86 to be shortened or lengthened wherein a locking device within ratchet mechanism 82 locks the cables 86 when positioned at the desired length. Cables 86 are routed over rollers 88 and the free ends are available for attachment to securing rings 90. Securing rings 90 enable dynamometers 96 to be secured to each corresponding cable 86. When a fan section F is loaded on the fan dolly 10, dynamometers 96 provide a means for measuring the amount of load placed on cables 86 which is indicative of the load placed on each stanchions 62. Although a dynamometer 96 is shown in the preferred embodiment, any number of other types of load indicating devices may be used such as strain gauges or the like. Dynamometers 96 are particularly convenient because they provide a visual display to an operator who is manipulating a fan section F loaded on the fan dolly 10.

Figure 6:
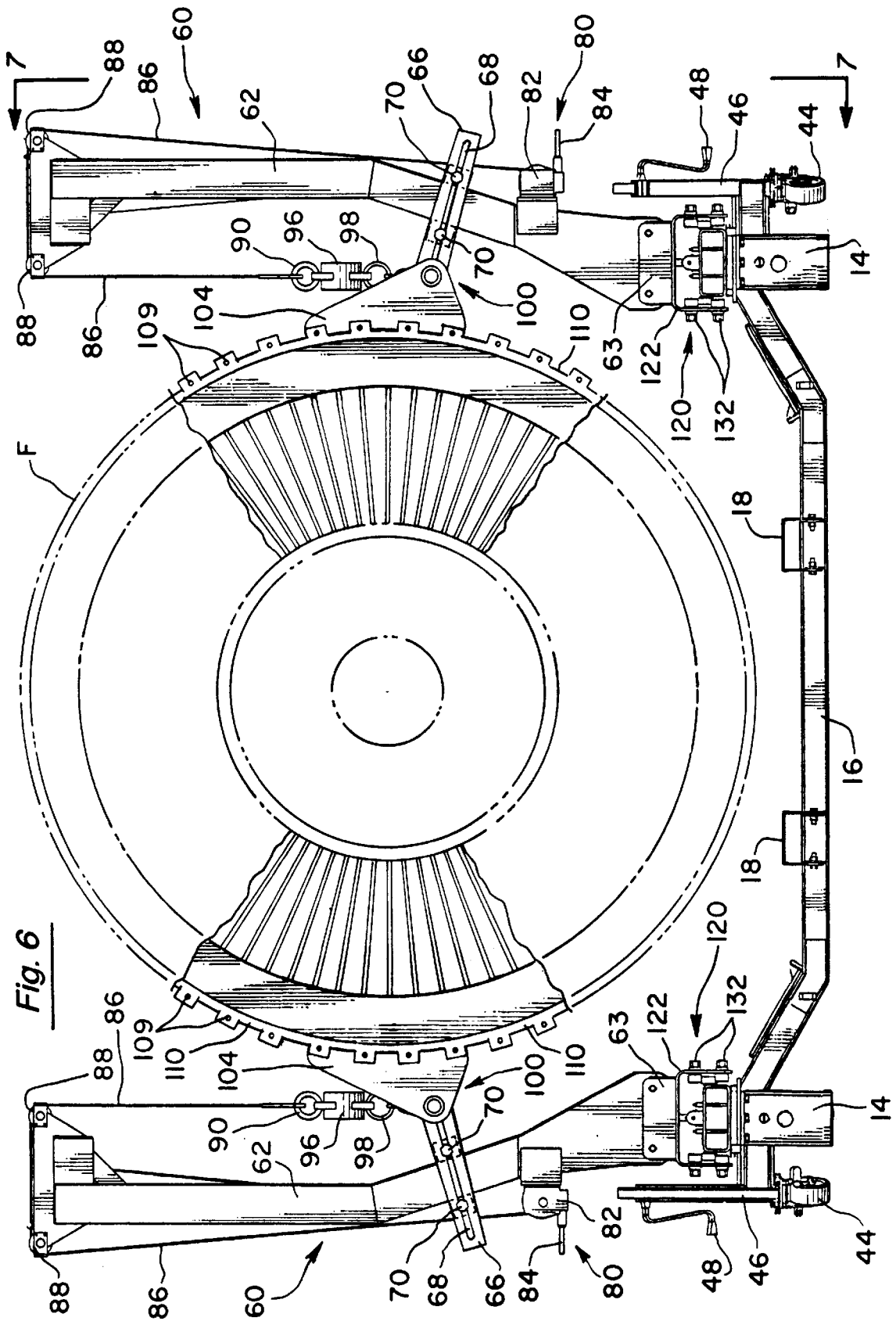
FIG. 6 is an enlarged front view of the fan dolly with the fan section loaded thereon.
Figure 7:
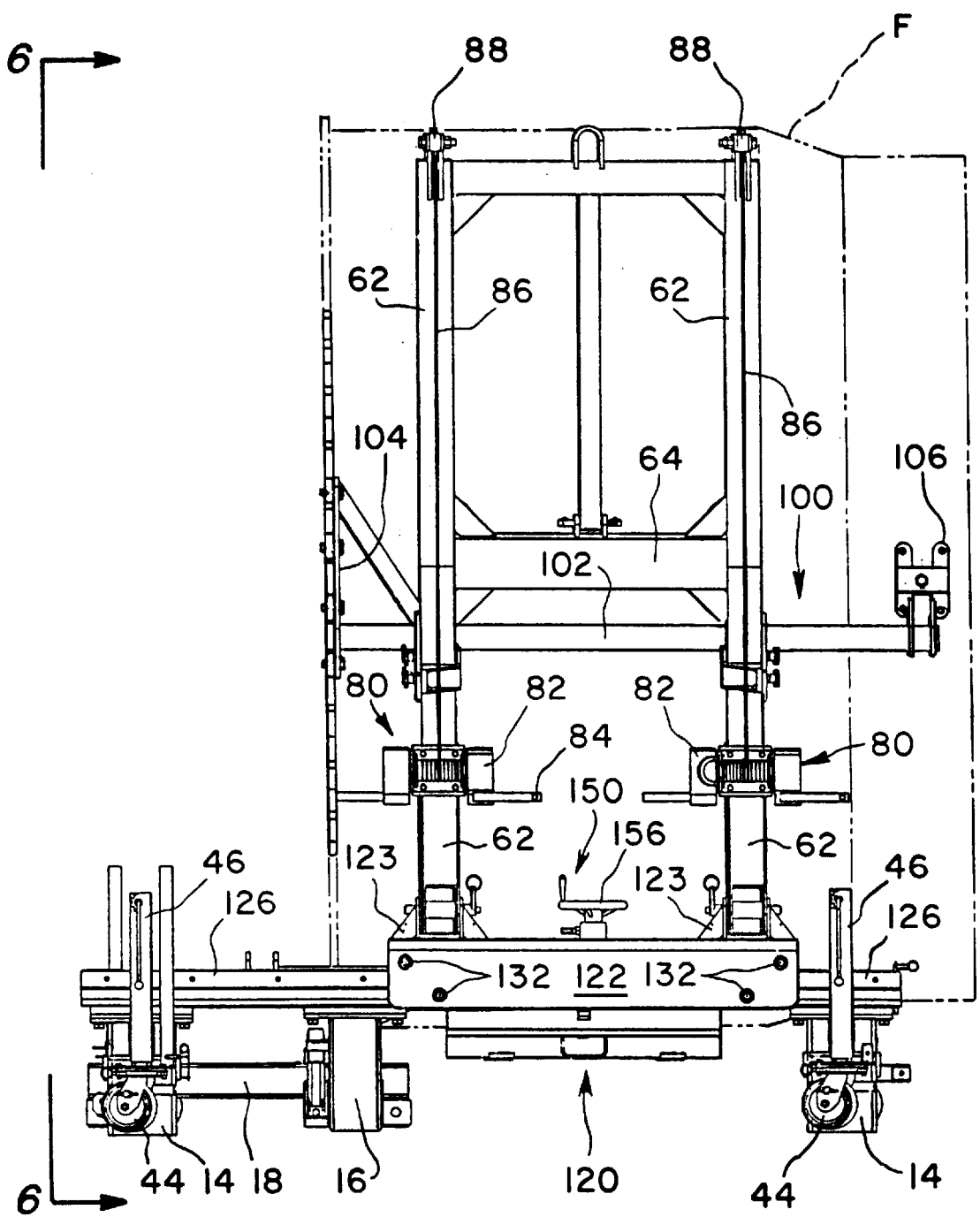
FIG. 7 is an enlarged elevational view of the fan dolly of this invention illustrating the fan section in phantom loaded thereon.
Figure 12:
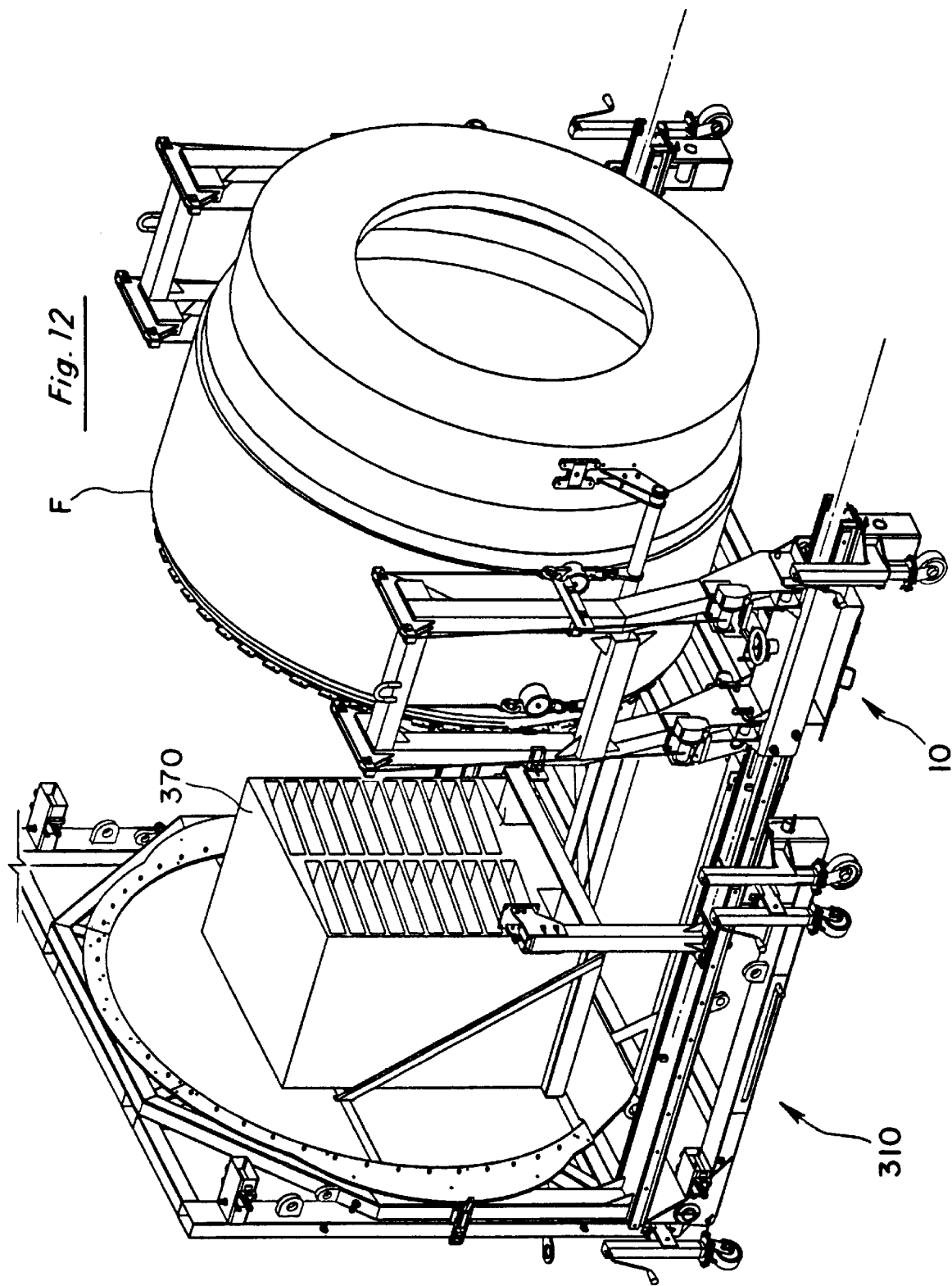
FIG. 12 is an enlarged perspective view of the fan dolly of this invention with the fan section loaded thereon and coupled to the fan shipping frame of this invention.

As best seen in FIGS. 5 through 7, each dynamometer 96 is connected to a corresponding attachment assembly 100 as by load rings 98. As illustrated in the preferred embodiment, there is one assembly 100 for each support assembly 60. Attachment assembly 100 provides a means for connecting the fan dolly 10 to the fan section F. Each assembly 100 includes an attachment rod 102 which hangs from load rings 98 such that rod 102 is positioned in a substantially horizontal manner. Integral with one end of attachment rod 102 is an A-shaped ground handling flange 104. Attached to the opposite end of rod 102 is an aft ground handling flange 106. Ground handling flange 106 is designed to mate with a matching ground handling pad on the fan section F. As shown in FIG. 4, flange 106 mates with ground handling pad 107. As best seen in FIGS. 5 and 6, A-shaped ground handling flange 104 attaches to the fan section F by aligning the bolt holes 108 of ground handling flange 104 with the bolt holes 109 of attaching ring 110 and then placing a securing pin or bolt through the aligned holes. After the attachment of ground handling flange 104 and 106, fan section F is safely secured to the fan dolly wherein the fan section is suspended between the stanchions 62. As shown in FIG. 6, a clearance exists between the peripheral edge of fan section F and cross member 16 such that the only points of contact between the fan section F and fan dolly are the ground handling flanges 104 and 106. Because of this suspended condition, stabilizers 66 are used to ensure that the fan section F does not rock or sway horizontally between stanchions 62. Thus, stabilizers 66 are not load bearing members, but are simply used to stabilize any possible swaying or traversing movement of fan section F. Since stabilizers 66 have adjustment slots 68, different size fan sections F may be secured by the fan dolly of this invention. When the fan dolly is not in use, attachment assemblies 100 may be stored on members 18; said members being conveniently configured to accept assemblies 100.

Once the fan section F has been loaded upon the fan dolly 10, it may be necessary to displace the fan section F horizontally at a constant height with respect to the ground. For example, when the fan section F needs to be removed from the core section C of the jet aircraft engine, there must be precise horizontal displacement to prevent the jamming of the bolts on the core section C (not shown) which retain the fan section F by the retaining ring 110. Also, since the core section C is inserted into a portion of the fan section F, it is important that there be at least 40 inches of precise horizontal displacement so that the core section C may be separated from the fan section F without contact between the two sections. Accordingly, as shown in FIGS. 8 and 9, train assemblies 120 are provided to enable such displacement of the fan section F. Each train assembly 120 includes a U-shaped train bracket 122 which engages with corresponding rail member 20. As best seen in FIG. 9, rail member 20 has attached to it, on opposing sides, a pair of track flanges 124 which support tracks 126. Disposed inside train brackets 122 are a plurality of lower track rollers 128 and upper track rollers 130 which engage with track 126 enabling each fan support assembly 60 to be traversed along a desired length of rail members 20. Rollers 128 and 130 are attached to train bracket 122 as by corresponding track roller nuts 132 which secure track roller pins 134.

To selectively control the movement of train assembly 120 along rail member 20, a traversing assembly 150 is provided integral with each train assembly 120. Each traversing assembly 150 includes a gear rack 152 which are attached to the upper surface of corresponding rail member 20 and which extend parallel with a portion of the length of the rail member 20. Both ends of rack 152 include a stop member 154 which limits the displacement of train assembly 120. As illustrated in FIG. 9, rack 152 is positioned on rail member 20 off center of line 11—11. Mounted on the center portion of each train bracket 122 is a traversing wheel 156 which provides a means for selectively controlling the traversing movement of the train assembly 120. Each traversing wheel 156 includes a vertical rod 158 which protrudes through the top surface of train bracket 122. Spur gear 160 is attached to the free end of vertical rod 158 and is engageable with corresponding gear rack 152. The cooperation of gear rack 152 with spur gear 160 is commonly referred to as "rack and pinon" control. As best seen in FIG. 10, the teeth 153 of gear rack 152 engage with the spaces 161 of spur gear 160. This engagement between gear rack 152 and spur gear 160 enables incremental control of the movement of each train assembly 120 along its corresponding rail member 20. As with the jack assemblies 46, the traversing assemblies 150 can be synchronized with one another to provide mirrored movement of each of the fan support assemblies 60 when traversing wheels 156 are rotated the same radial amount. Conveniently, a measuring scale (not shown) may be located on rail members 20 to indicate the displacement of each fan support assembly 60. To provide support to vertical rod 158, bushing 164 is provided with a collar 162 disposed exteriorly thereof.

In order to lock the traversing movement of each of the train assemblies 120, engaging pins 170 are provided. As shown in FIG. 11a, if it is desired to lock a train assembly 120 at a specific location, the free end 171 of engaging pin 170 is positioned perpendicularly with respect to the ground and is held in the locked position by means of retaining spring 174. Retaining spring 174 is configured such that engaging pin 170 is urged to the closed or locked position. When it is desired to unlock the train assembly 120 for displacement, the free end 171 of engaging pin 170 is pulled out and rotated 90 degrees (90°) so that free end 171 rests against slot portion 173 of engaging sleeve 172. In the locked position, the engaged end 175 of engaging pin 170 is inserted within pin well 180 of vertical rod 158. In the unlocked or free position, engaged end 175 is removed from pin well 180 so that traversing wheel 156 may be freely turned. Although a pin and spring combination is shown in the preferred embodiment, it will be understood that this invention also contemplates other means to releasably lock the train assembly 120, for example, by use of a clutch mechanism or other devices well within the knowledge of those skilled in the art.

B. Jet Aircraft Engine Shipping Stand

Now turning to the jet aircraft engine shipping stand 210 of this invention, as shown in FIG. 13, the shipping stand includes a frame assembly 211 having a pair of laterally spaced and longitudinally extending frame members 212 connected by at least one cross frame member 214 and at least one stabilizing member 216. Each of the members of the frame assembly 211 may be constructed of heavy gauge steel channel or bar which provides adequate support to a jet aircraft engine loaded thereon. Operatively engaged with the frame assembly 211 are wheel assemblies 218. As understood by those skilled in the art, wheel assemblies 218 may be engaged with the frame assembly 211 in a desired manner such that the wheels provide the necessary locomotive capability for wheeled transport. As shown in FIG. 13, the rear wheels are mounted to a steering assembly 219 which is directly mounted to cross-frame member 214. The front wheels are mounted directly to a front portion of longitudinal members 212. Conveniently, a goose neck extension 220 with towing pintle 222 is attached to the steering assembly 219 so that a wheeled vehicle may tow the shipping stand 210.

Figure 14:
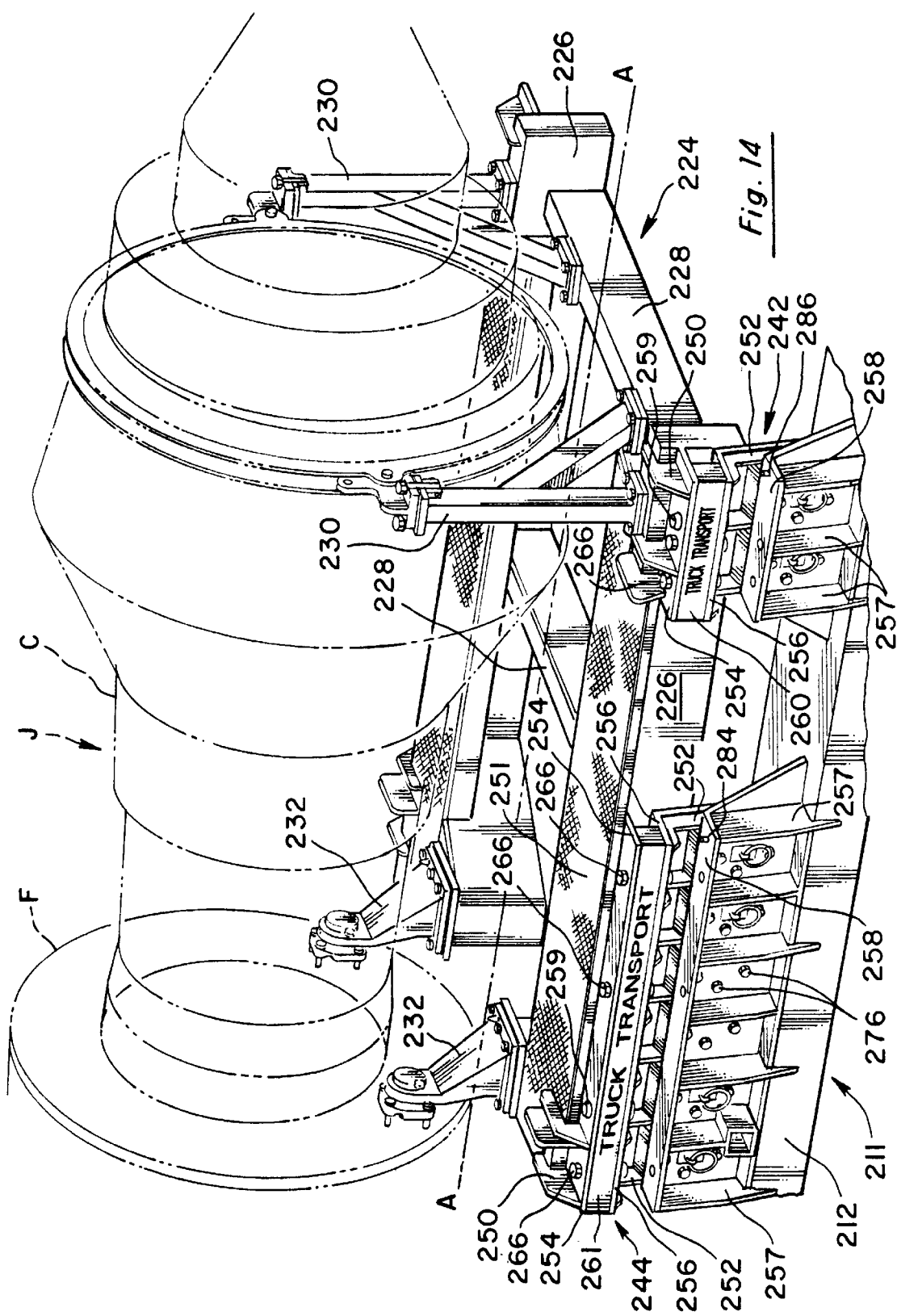
FIG. 14 is an enlarged fragmentary perspective view of the shipping stand of this invention as shown in FIG. 13.
Figure 15:
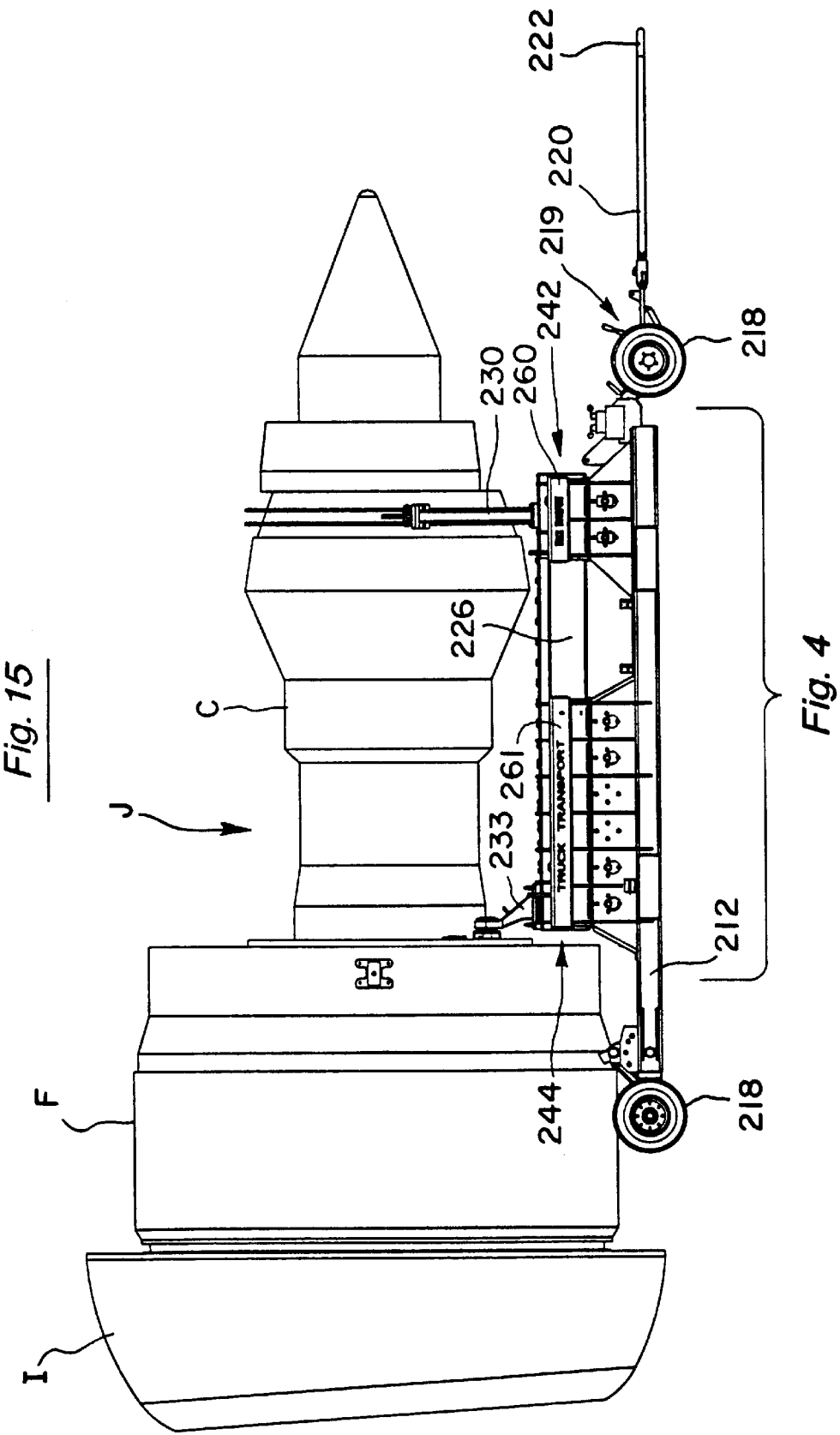
FIG. 15 is a side elevation of the shipping stand of this invention when the shipping stand is in the truck transport mode.

As best seen in FIG. 14, mounted on the frame assembly 211 is a cradle assembly 224. The cradle assembly 224 includes a pair of longitudinal supports 226 which are interconnected by a pair of transverse supports 228. Supports 226 and 228 substantially conform in length to longitudinal frame members 212 and cross frame members 214. Mounted on the rearward corners of cradle assembly 224 are stanchions 230. Stanchions 230 serve to secure the core section C of the jet aircraft engine J. A pair of engine mounts 232 are mounted on the forward corners of the cradle assembly 224. Engine mounts 232 are used to secure the inlet cowl of jet aircraft engine J to the cradle assembly.

A pair of aft mode transport assemblies 242 and a pair of forward mode transport assemblies 244 are integral with the cradle assembly 224 enabling the shipping stand 210 to be placed in either a truck transport mode or air transport mode. Although a pair of forward and aft mode transport assemblies are shown in the preferred embodiment, it will be understood by those skilled in the art that a single mode transport assembly may be provided on each side of the shipping stand, or more than two pair of mode transport assemblies may be used depending upon the type of jet aircraft engine to be transported. Axis A—A is provided to illustrate the symmetry of the shipping stand along its longitudinal axis. That is, the structure of the shipping stand includes two identical sides which are bisected by the longitudinal axis A—A.

As shown in FIG. 14, aft mode assembly 242 and forward mode assembly 244 each include a plurality of stabilizing transport webs 250 which are attached in a perpendicular manner as by welding to longitudinal support 226. Support decking 251 is secured to longitudinal support 226 in order to provide clear walking space on cradle assembly 224. Each assembly 242 and 244 includes an upper transport flange 254 which extends along a specified length of longitudinal support 226 and is attached as by welding to longitudinal support 226 and to the free ends of upper stabilizing webs 250. Disposed below webs 250 are a plurality of lower stabilizing webs 252. As will be discussed below, lower stabilizing webs 252 attach to corresponding transport brackets 271, as best seen in FIGS. 18a and 18b. Each assembly 242 and 244 also includes lower transport flange 256 which extends along a specified length of support 226 and is attached as by welding to the free ends of lower stabilizing webs 252. Transport flanges 254 and 256 are arranged in parallel relationship to accommodate placement of spacers 260 and 261. When the shipping stand of this invention is placed in the truck transport mode, gaps exist between upper flanges 254 and lower flanges 256. Conveniently, these gaps correspond to the height of aft spacers 260 and forward spacers 261 which enables spacers 260 and 261 to be placed in the gaps. As shown in FIG. 14, aft mode assembly 242 and forward mode assembly 244 differ in the number of stabilizing webs 250 and 252, and corresponding lengths of stabilizing flanges 254 and 256.

Figure 19A:
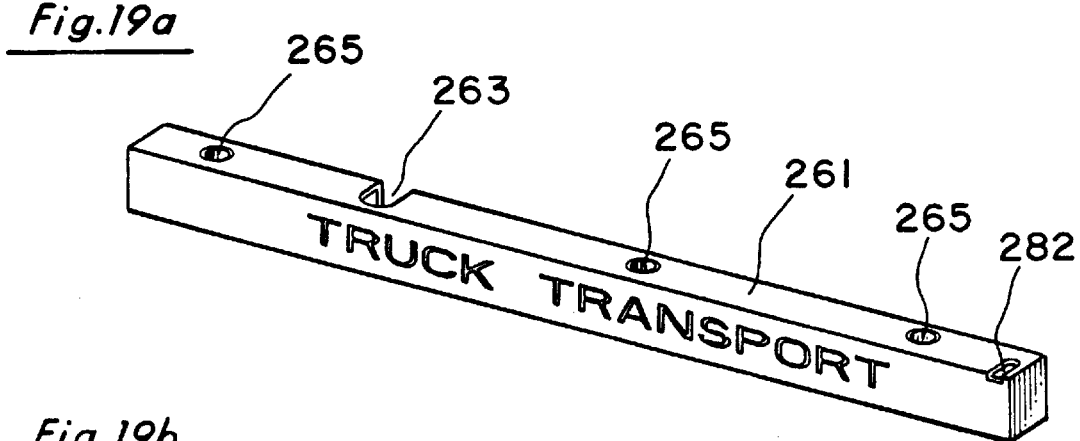
FIG. 19a is a perspective view of a forward spacer illustrating the truck transport indicia.
Figure 19B:
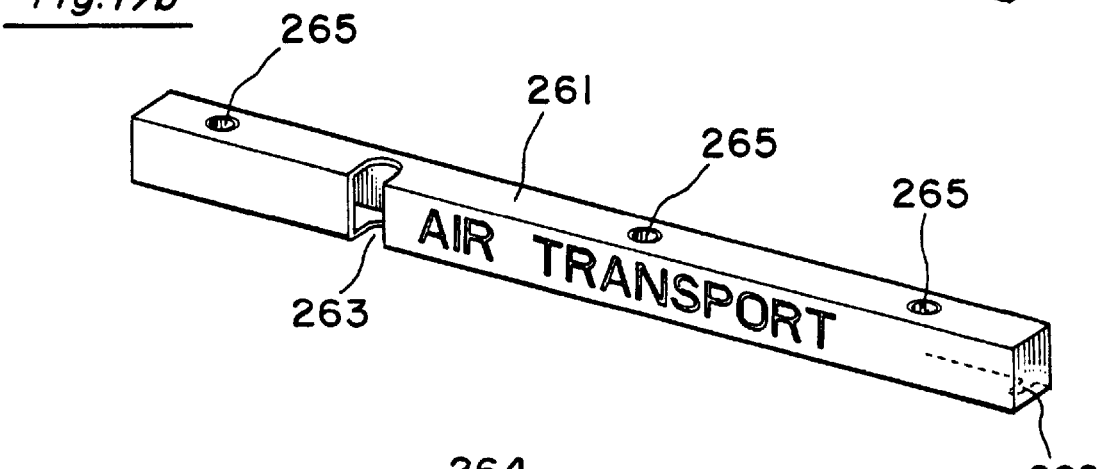
FIG. 19b is a perspective view of a forward spacer illustrating the air transport indicia.
Figure 20A:
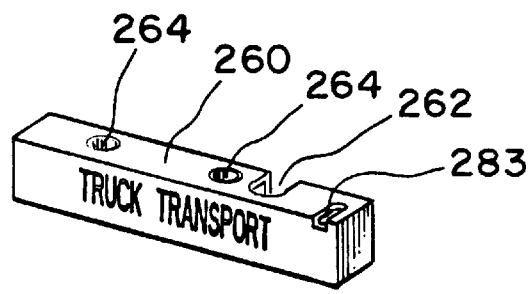
FIG. 20a is a perspective view of an aft spacer illustrating the truck transport indicia.
Figure 20B:
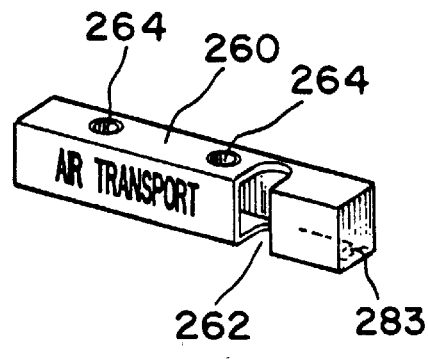
FIG. 20b is a perspective view of an aft spacer illustrating the air transport indicia.

As best seen in FIGS. 19a and 19b, forward spacer 261 is of a rectangular cross section and includes a truck mode transport slot 263 formed on an exterior edge thereof. Forward spacer 261 further includes an air mode transport slot 282. A plurality of alignment holes 265 are formed through the forward spacer and which cooperate with a corresponding plurality of spacer retaining bolts 266, as shown in FIGS. 21a and 21b, as will be discussed further below. Similarly, as shown in FIGS. 20a and 20b, aft spacer 260 includes a truck mode slot 262, a plurality of alignment holes 264, and an air mode transport slot 283.

Figure 16:
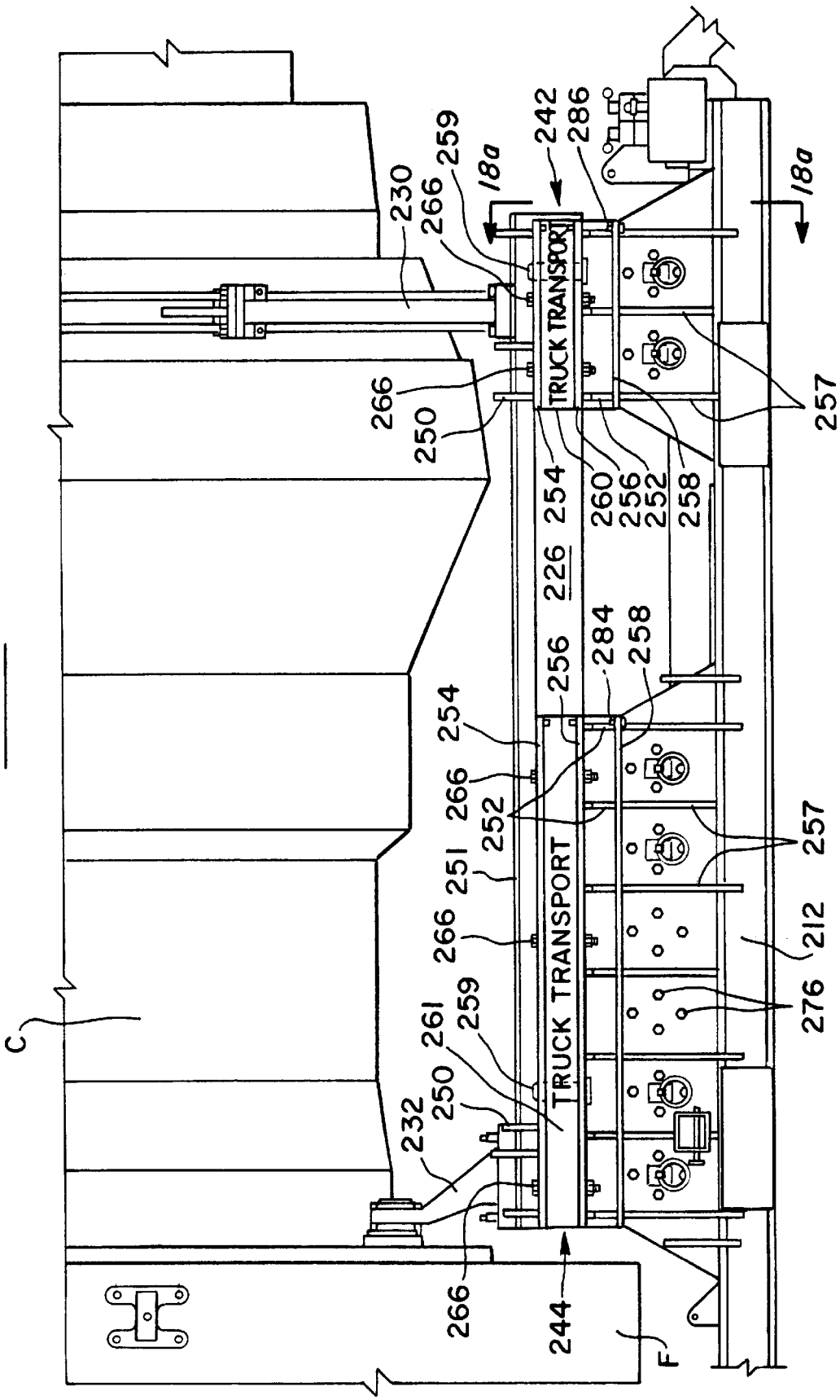
FIG. 16 is an enlarged fragmentary side elevation of the shipping stand of this invention, as shown in FIG. 15, when the shipping stand is in the truck transport mode.

As best seen in FIG. 21a, when the shipping stand 210 is configured in the truck transport mode, each spacer 261 is placed in the gap between corresponding upper transport flange 254 and lower transport flange 256 so that alignment holes 265 are aligned for receiving corresponding spacer retainer bolts 266. Spacer retainer nuts 267 engage with the retaining bolts to secure each spacer 261 in position. In the truck transport mode, mode pins 259 cooperate with mode slots 263. Truck mode pins 259 are secured at their lower ends to flanges 256 and are insertable at their upper ends through flanges 254. Because of the positioning of the truck transport indicia with respect to slots 263, only the truck transport indicia can be exposed when the spacers are inserted between flanges 254 and 256. Accordingly, the arrangement of pins 259 with respect to slots 263 serve as safety measures to ensure that the spacers 261 are properly positioned. When the shipping stand is configured in the air transport mode, the gaps between flanges 254 and 256 are eliminated causing pins 259 to be pushed upwardly through flanges 254. Spacers 261 may be then stored in the gaps between lower transport flanges 256 and storage support flanges 258, and secured by means of bolts 266 and nuts 267. To ensure that the truck transport indicia is not inadvertently exposed when the shipping stand is configured in the air transport mode, air transport slots 282 cooperate with air transport retaining pins 284 to allow spacers 261 to be stored in the gaps between flanges 256 and 258. Aft mode assemblies 242 utilize aft spacers 260 in the same manner as forward mode assemblies 244 utilize forward spacers 261. That is, the positioning of mode slots 262 with respect to corresponding pins 259 ensures that an operator of the shipping stand may view the proper indicia to determine which mode the shipping stand is configured. Similarly, aft spacers 260 each have an air transport slot 283 that cooperates with a corresponding retaining pin 286, shown in FIGS. 14 and 16, to ensure the air transport indicia is properly displayed.

As best seen in FIGS. 18a and 18b, the storage support flanges 258 are integral with storage support brackets 272. Storage support webs 257 are connected to brackets 272 and member 212 to provide the necessary support to flanges 258. As shown in FIG. 18a, when the shipping stand 210 is configured in the truck transport mode, spacers 260 are placed between upper transport flanges 254 and lower transport flanges 256. In this mode, the load of the jet aircraft engine is placed upon spacers 260 and is transmitted through transport brackets 271 to shock absorbers 274. Thus, the desired shock support is provided when the shipping stand is in the truck transport mode by transferring the load of the jet aircraft engine onto shock absorbers 274. As shown in FIG. 18b, when the shipping stand is configured in the air transport mode, the cradle assembly 224 is lowered by a distance D and the gaps between flanges 254 and 256 are eliminated causing the load of the jet aircraft engine to be directly transmitted from the cradle assembly to the frame assembly. That is, since no load is placed on shock absorbers 274, the load of the aircraft engine receives no shock absorbing protection therefrom.

As further illustrated in FIGS. 18a and 18b pistons 269 are concentrically mounted within cylinders 268 to form common hydraulic lift devices or lifting mechanisms. Conveniently, cradle assembly 224 may be lifted by means of pistons 269 which contact the lower surfaces of longitudinal supports 226 and which are activated by the control of hydraulic fluid from a hydraulic pump (not shown). To configure the shipping stand in the truck transport mode, the cradle assembly 224 is raised to a specified height which enables spacers 260 and 261 to be inserted in the gaps between flanges 254 and 256. Once the spacers are securely in place, hydraulic pressure within cylinders 268 and pistons 269 are relieved which transfers the load of the loaded jet aircraft engine onto the respective shock absorbers 274. When it is desired to lower the cradle assembly 224 for placing the shipping stand 210 in the air transport mode, the lifting mechanisms are activated, spacers 260 and 261 are removed, and cradle assembly 224 is lowered by controlling the movement of pistons 269 in a reverse direction. Although the lifting mechanisms of this invention are described as hydraulic lifting devices, it will be understood that other suitable lifting mechanisms may be used such as mechanical scissor jacks or the like.

Figure 22:
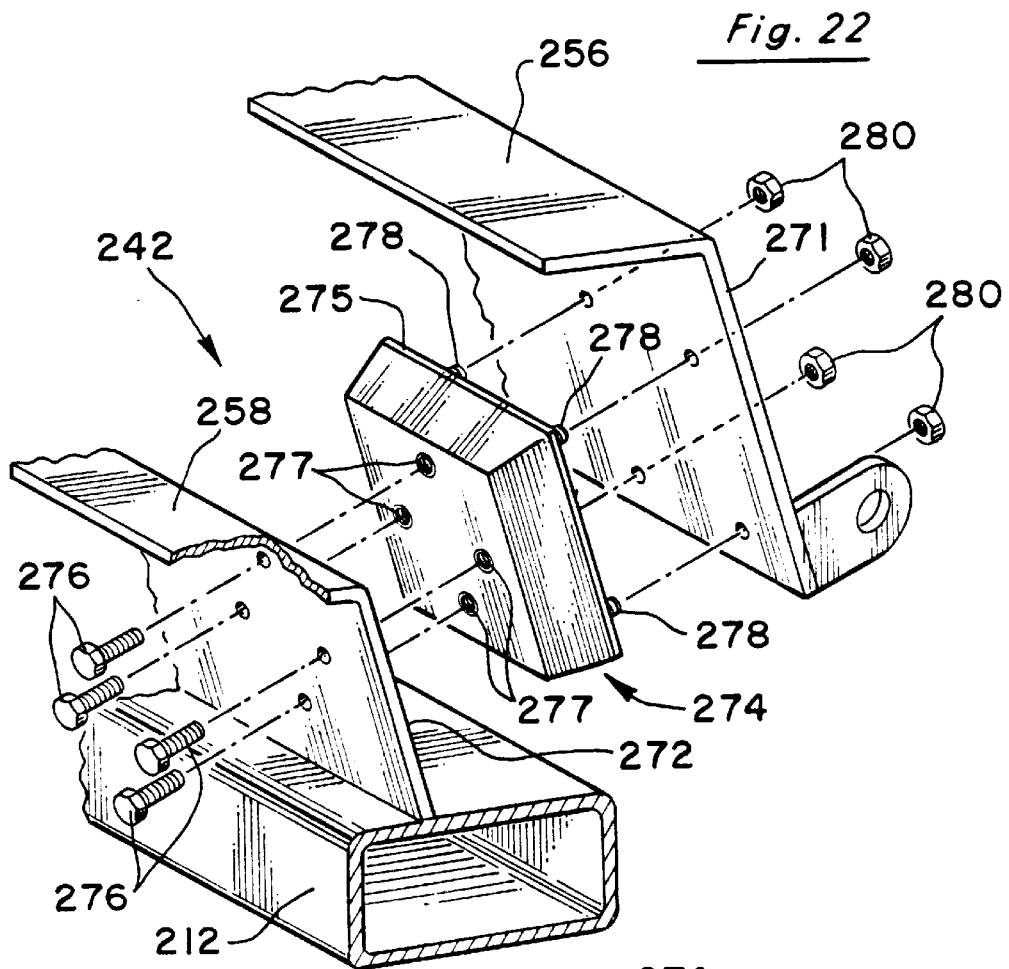
FIG. 22 is an enlarged exploded perspective fragmentary view of a shock absorber engageable with the shipping stand of this invention.
Figures 23A, 23B, 23C, 23D:
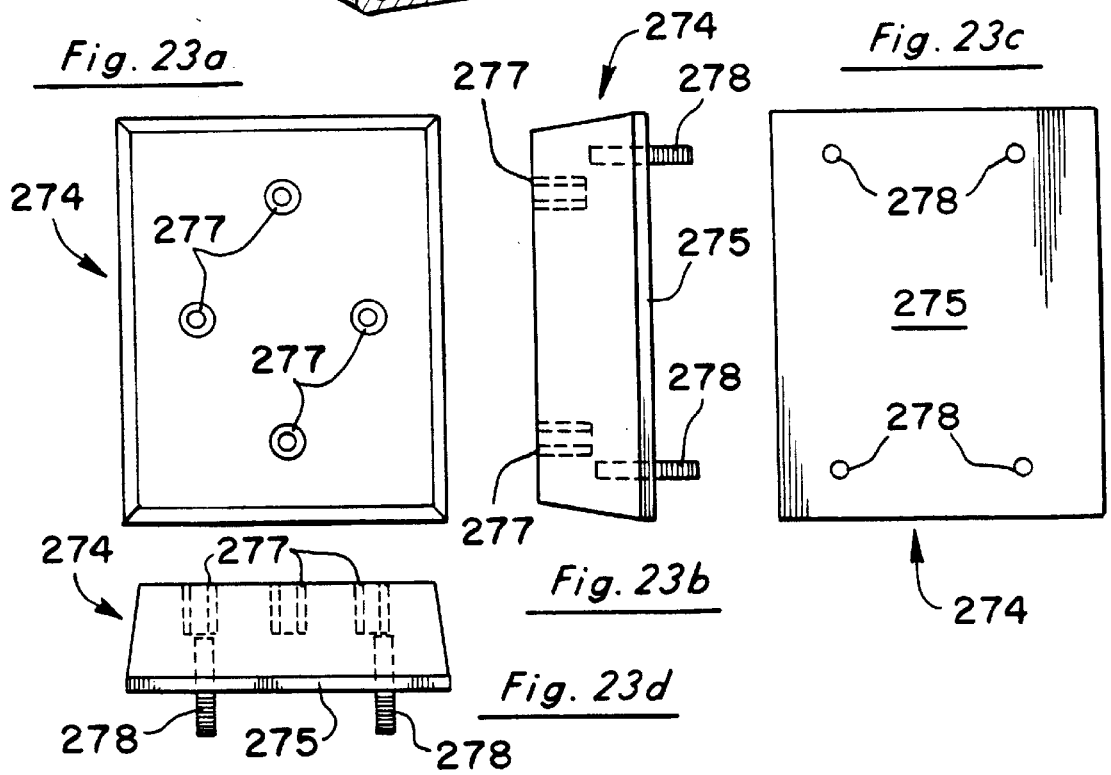
FIG. 23a is a front view of a shock absorber of the shipping stand of this invention.
FIG. 23b is a side view of the shock absorber.
FIG. 23c is a rear view of the shock absorber.
FIG. 23d is an elevational view of the shock absorber.

As seen in FIG. 22, shock absorbers 242 achieve the function of shock absorption by positioning them between the frame assembly 211 and cradle assembly 224. Specifically, each shock absorber 274 operatively connects storage support bracket 272 of the frame assembly 211 to transport bracket 271 of the cradle assembly 224. A plurality of support bracket bolts 276 may be inserted through storage support bracket 272 and received in threaded wells 277 located on one side of each shock absorber 274. On the opposite side of each shock absorber 274, a shock absorber back plate 275 is provided which includes a plurality of shock absorber bolts 278 protruding therefrom. Bolts 278 pass through corresponding holes in each transport bracket 271 and are secured as by means of transport bracket nuts 280. Although a specific arrangement of support bracket bolts and shock absorber bolts are shown, it will be understood that the invention claimed herein is not limited to any specific arrangement therein.

C. Fan shipping Frame

Figure 24:
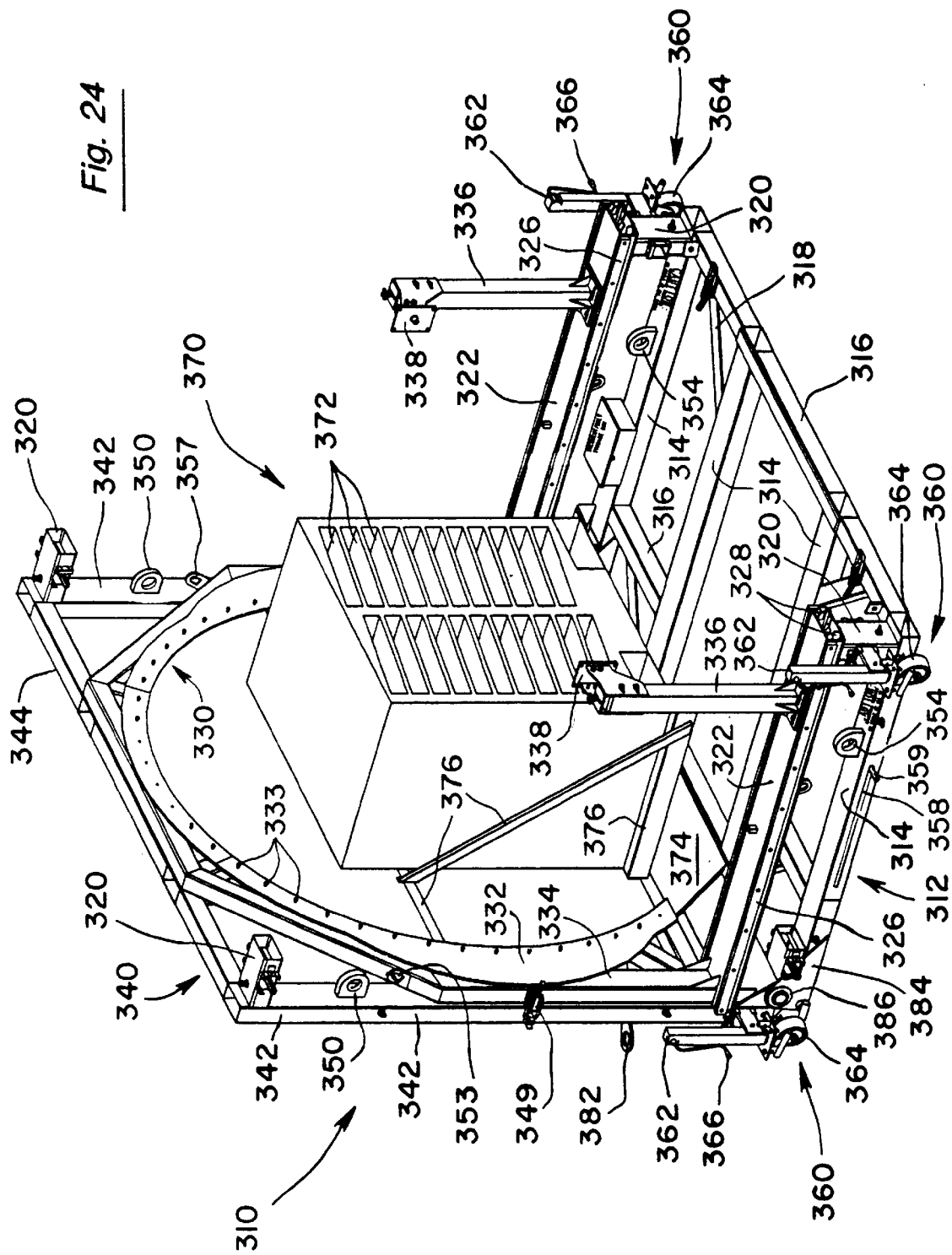
FIG. 24 is a perspective view of the fan shipping frame of this invention.
Figure 25:
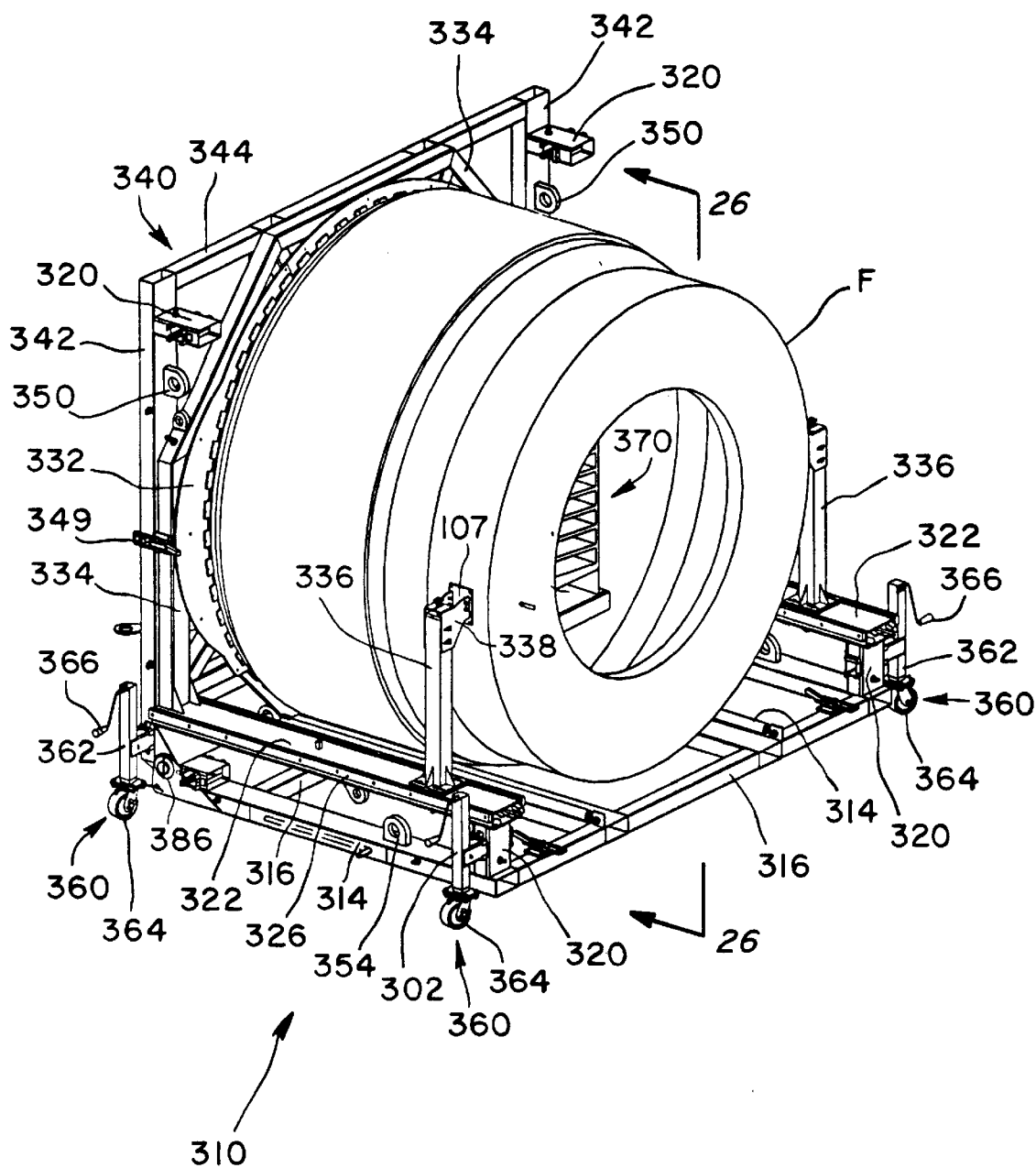
FIG. 25 is a perspective view of the fan shipping frame of this invention with a fan section mounted thereon.

Now, turning to the fan shipping frame 310 of this invention, as best seen in FIG. 24, it includes a frame assembly 312 having a plurality of longitudinal members 314 interconnected by a plurality of transverse members 316. Additionally, to provide greater frame support, diagonal members 318 are interspersed along the frame assembly and attached to members 314 and 316. The frame assembly may be assembled by welding the members together or, alternatively, an appropriate bolt and nut combination may be utilized.

Figure 28:
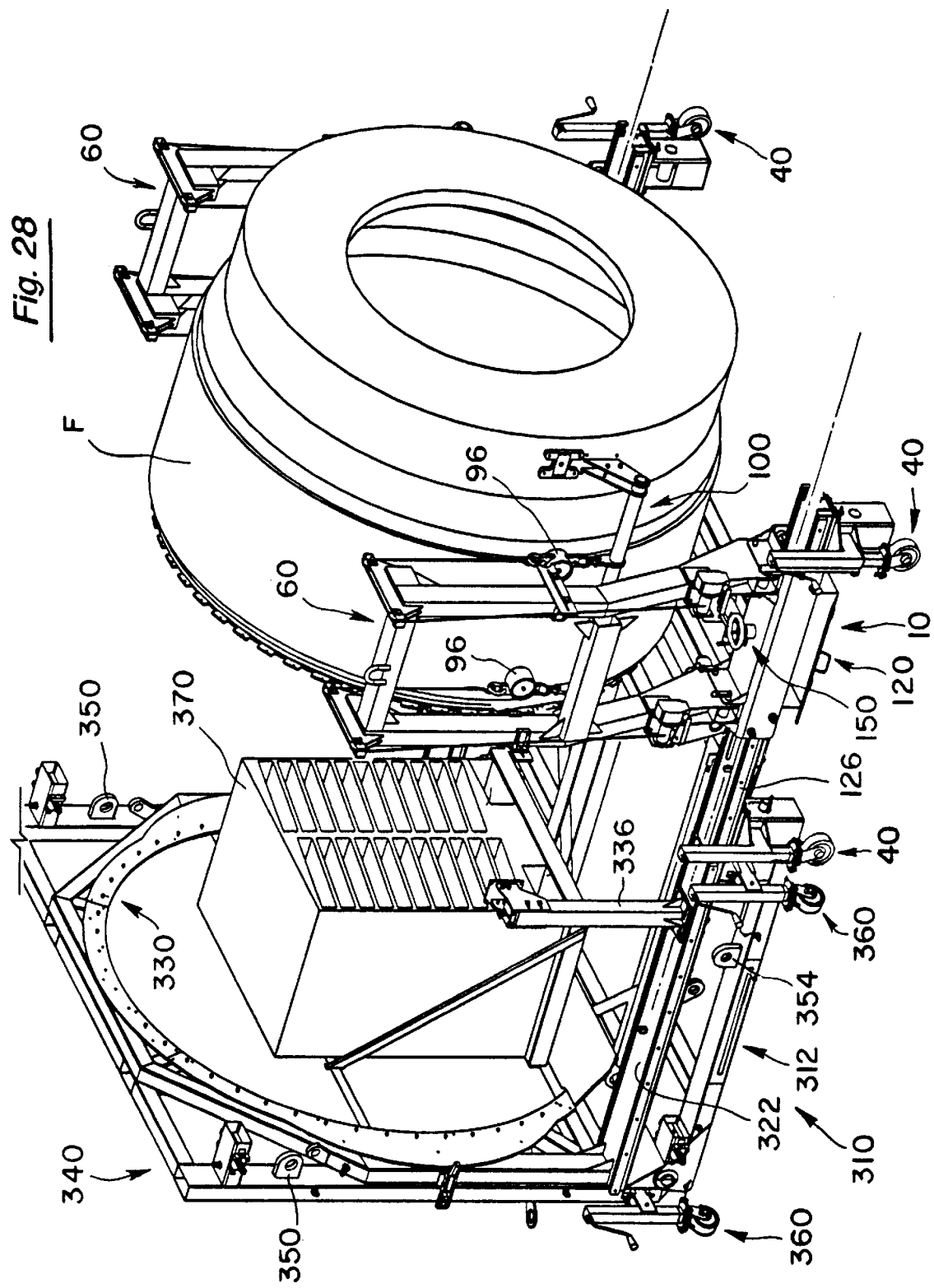
FIG. 28 is a perspective view of the fan dolly of this invention coupled to the fan shipping frame of this invention, as shown in FIG. 12.

Mounted on each corner of the frame assembly 312 is a pylon 320. As best seen in FIG. 24, pylons 320 serve to connect rail members 322 to the frame assembly 312. As shown, a pair of rail members 322 are mounted in parallel relationship on the frame assembly 312. As best seen in FIGS. 28 and 29a, rail members 322 cooperate with the rail members 126 of the fan dolly 10 as by male connecting members 323 which are inserted within the interior space of rail member 126. The positioning and construction of rail members 322 are designed to receive the train assembly 120. That is, as with the tracks 126 mounted on rail members 20 of train assembly 120, rail member 322 includes tracks 326 which are disposed on each side of the rail member. Thus, when the fan section F is transferred from the fan dolly 10 to the fan shipping frame 310, tracks 326 engage with rollers 128 and 130 of train assembly 120.

In addition to the pylons 320 which attach rail members 322 to the frame assembly 312, there is also a pair of pylons 320 which are positioned on the platform assembly 340. As will be discussed below, the pylons 320 on platform assembly 340 enable caster assemblies 360 to be attached thereto in order to provide locomotive and lift capability to the fan shipping frame when the fan shipping frame is tilted to the horizontal position.

Figure 26:
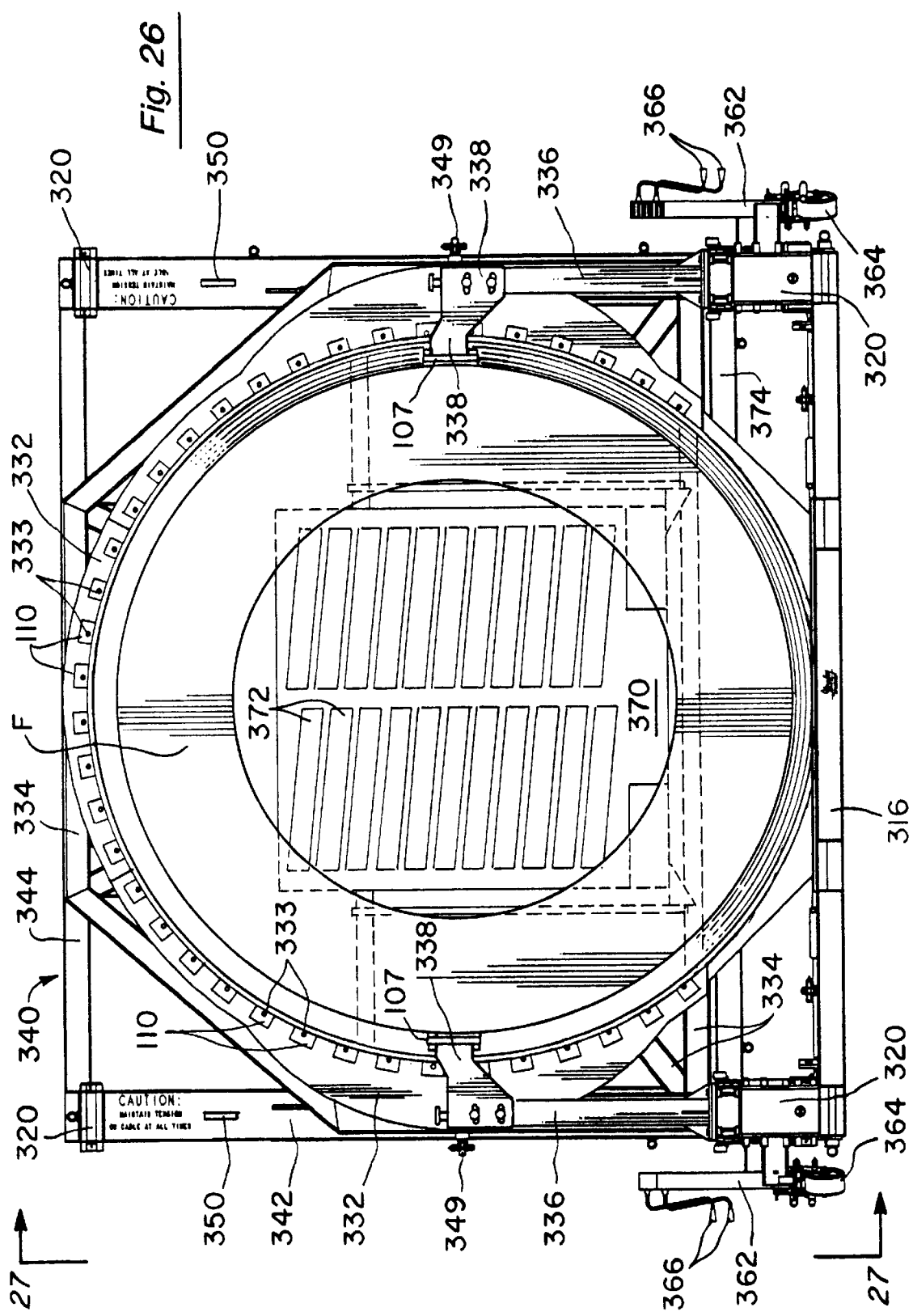
FIG. 26 is a rear elevation of the fan shipping frame of this invention with a fan section mounted thereon.

As seen in FIGS. 24 and 26, when the fan section F is loaded on the fan shipping frame, the fan section is secured to fan support assembly 330 by means of a plurality of bolts (not shown) which extend through template 332 of fan support assembly 330; template 332 having a plurality of bolt holes 333 which align with bolt holes 109 of attaching ring 110. The template 332 is secured to the platform assembly 340 by means of a plurality of template bracket bars 334. In addition to template 332, a pair of stanchion stabilizers 336 are provided to secure the fan section F to the fan shipping frame 310. Stanchion stabilizers 336 attach to rail members 322. The upper end of stanchion stabilizers 336 include stanchion attachment brackets 338 which engage with the ground handling pads 107 of fan section F.

In order that the shipping frame 310 may be tilted to a horizontal position for transport on aircraft such as a C130, platform assembly 340 is provided which connects with frame assembly 312 by means of hinge mechanism 386. As will be discussed below in reference to FIGS. 33 through 36, hinge mechanism 386 enables platform assembly 340 to rotate so that platform assembly 340 lies opposite to and in line with frame assembly 312. Platform assembly 340 includes a pair of longitudinal bars 342 interconnected by cross bar 344. When the fan shipping frame is configured in the upright or vertical position, platform assembly 340 is secured to template bracket bars 334 by means of a pair of platform locks 349.

Mounted to pylons 320 are caster assemblies 360. Caster assemblies 360 are of the same construction as caster assemblies 40 of the fan dolly 10. More specifically, each caster assembly 360 includes a jack mechanism 362 with corresponding hand crank 366 which enables the fan shipping frame 310 to be adjusted to the desired height by engaging hand cranks 366. Integral with jack mechanisms 362 are wheels or casters 364 which provide the necessary locomotive capability to the fan shipping frame. Caster assemblies 360 may be mounted on either the frame assembly 312 or the platform assembly 340, depending upon how the fan section is configured for transport.

Figure 27:
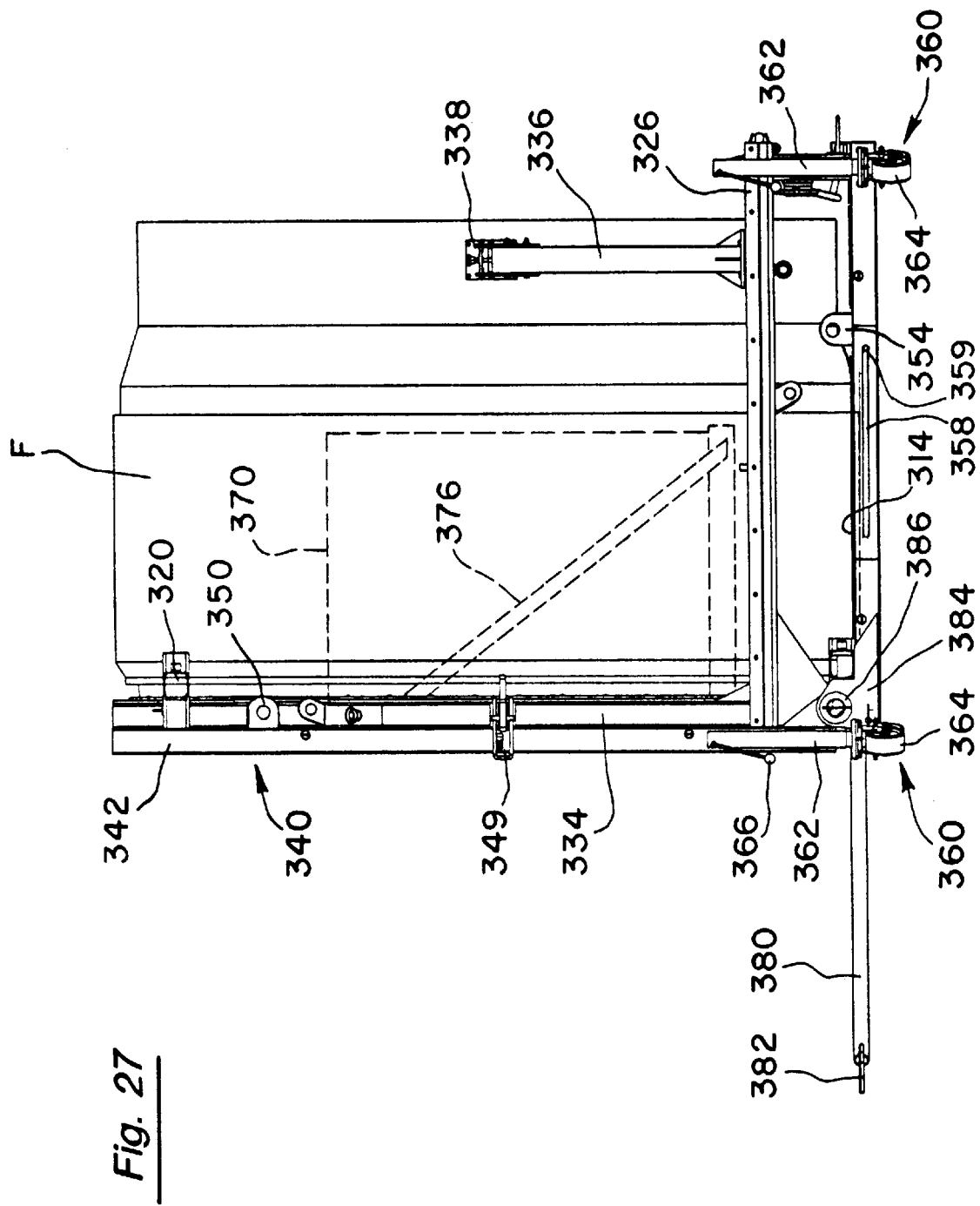
FIG. 27 is a side elevation of the fan shipping frame of this invention with a fan section mounted thereon.

Typically, when the fan section F is transported on the shipping frame, the inlet cowl I is first removed and then the individual fan blades (not shown) of the fan section are also removed therefrom. Conveniently, fan blade storage container 370 is provided which may mount upon frame assembly 312. Fan blade storage container 370 includes a plurality of storage cells 372, as best seen in FIGS. 24 and 26, which are adapted to receive the fan blades of the fan section F. Thus, regardless whether the fan section F is being transported in the vertical or horizontal position on the fan shipping frame 310, the fan blade storage container 370 provides a means for securing and transporting the fan blades. As best seen in FIG. 24, container 370 is mounted to the shipping frame 310 by means of support brackets 376 which connect to the frame assembly 312 and platform assembly 340. Splash guard 374 is mounted to frame assembly 312 and is provided to protect the storage container 370. As illustrated in FIG. 27, if it is necessary to transport the shipping frame 310 over the ground by a vehicle, conveniently, tow extension 380 is provided wherein pintle 382 connects to the ball hitch of the vehicle.

In operation, once the fan section F is removed from the core section C and secured to the fan dolly 10, and the inlet cowl I is separated from the fan section F, the fan section F may be loaded on the fan shipping frame 310. As shown in FIGS. 28, 29 and 29a, fan dolly 10 is coupled with fan shipping frame 310 by means of male connecting members 323 forming a compression-type fitting connection.

Figure 31:
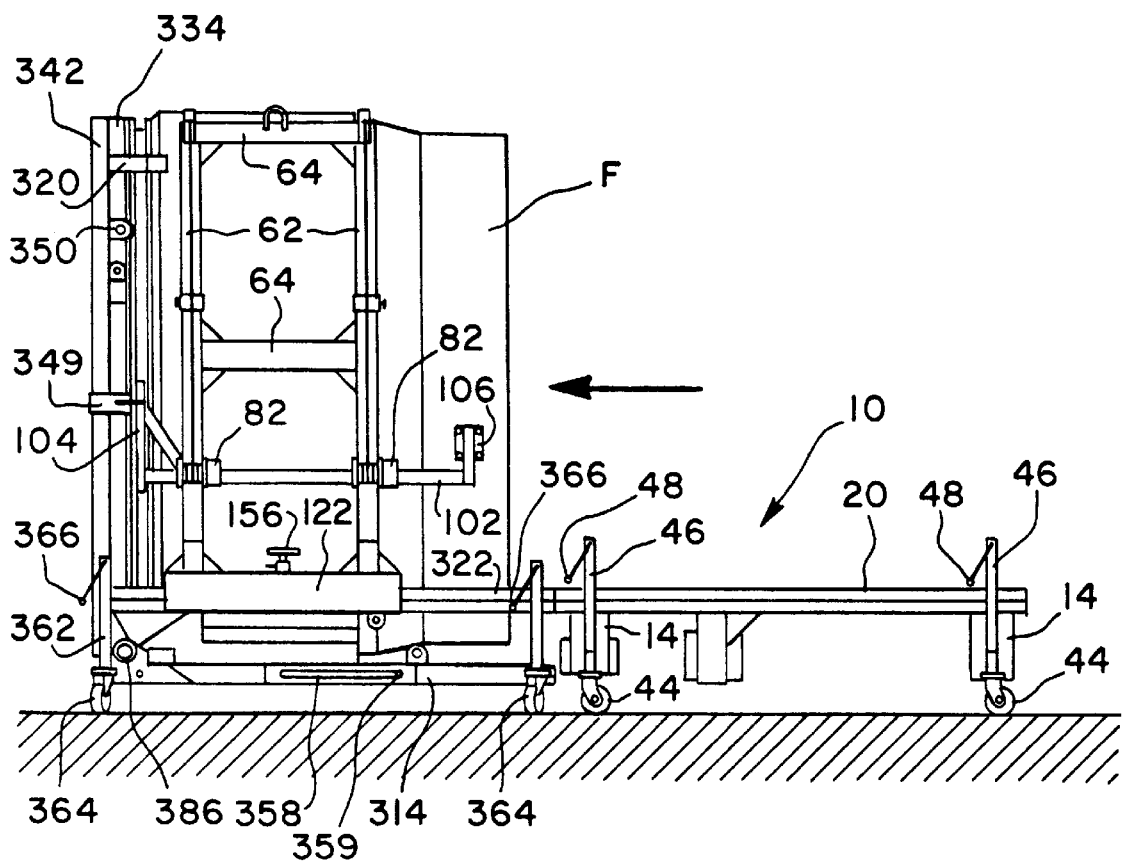
FIG. 31 is a side elevation, as shown in FIGS. 29 and 30, illustrating the fan section after being transferred from the fan dolly to the fan shipping frame.
Figure 32:
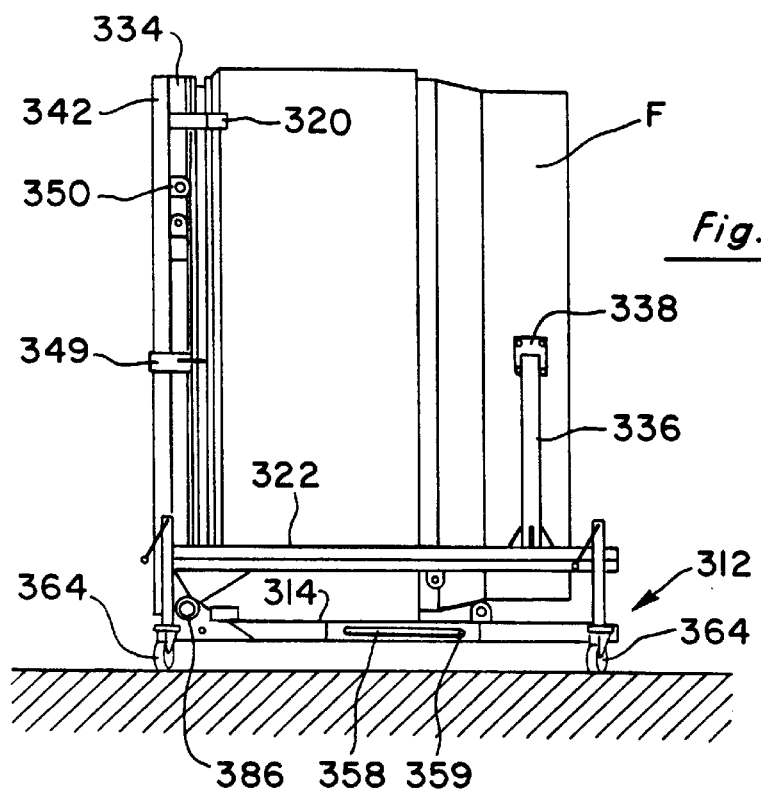
FIG. 32 is a side elevation of the fan shipping frame after the fan dolly has been separated therefrom.

As shown in FIG. 30, fan section F may be transferred onto shipping frame 310 by manipulating wheels 156 of train assemblies 120 or by simply pushing the fan section F when the train assembly 120 is disengaged to cause train assemblies 120 to displace along rail members 20 and then onto rail members 322. Prior to the transfer of the fan section F onto the shipping frame 310, the stanchion stabilizers 336 must be removed since they are mounted on rail members 322. As shown in FIG. 31, once the fan section F has been completely moved onto the fan shipping frame 310, the fan section F is then in a position for securing it to the shipping frame by aligning the template 332 with attaching ring 110 and placing bolts or securing pins (not shown) through the aligned holes 109 and 333. Once the fan section F is secured to the shipping frame 310, as seen in FIG. 32, brackets 104 and 106 may be disengaged from the fan section F, and train assemblies 120 may be displaced back across the shipping frame 310 onto fan dolly 10. Then fan shipping frame 310 may be separated from the fan dolly 10 resulting in the fan section F being fully supported solely by the shipping frame 310. After the disengagement of brackets 104 and 106, stanchion stabilizers 336 are repositioned on rail members 322 and stanchion attachment brackets 338 are connected to ground handling pads 107.

Figure 33:
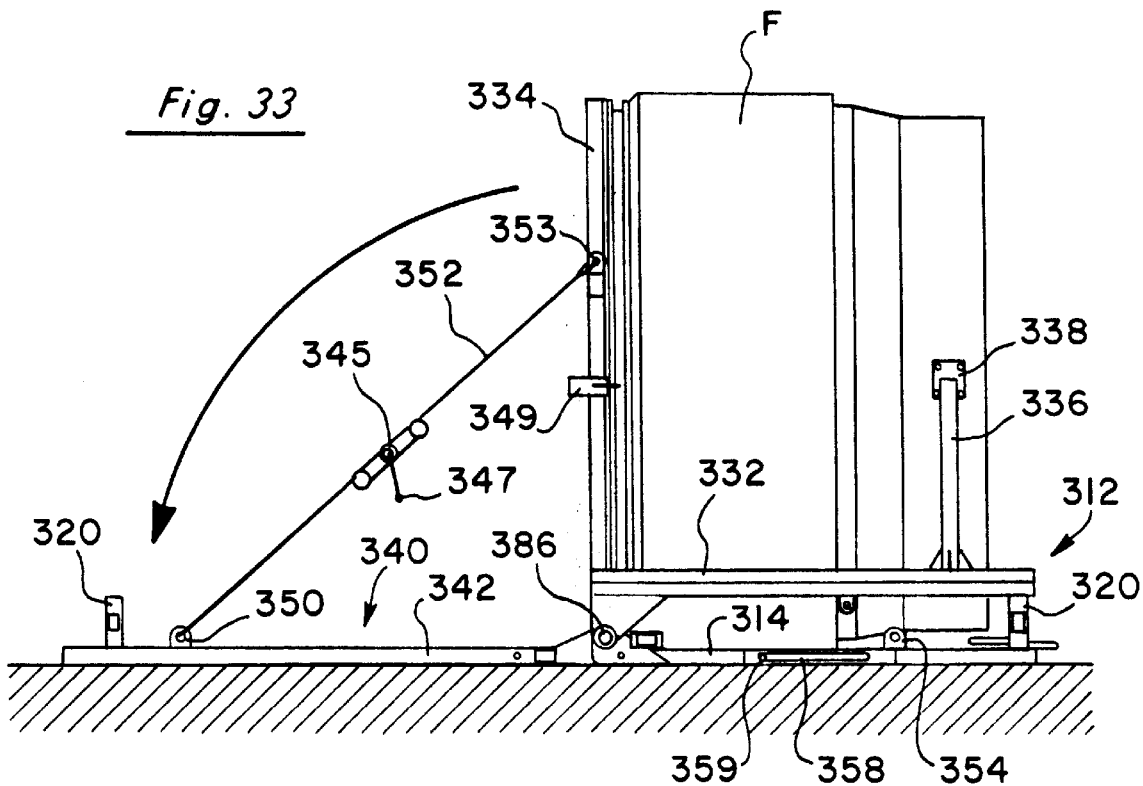
FIG. 33 is a side elevation of the fan shipping frame with fan section mounted thereon illustrating the deployment of the platform assembly.
Figure 34:
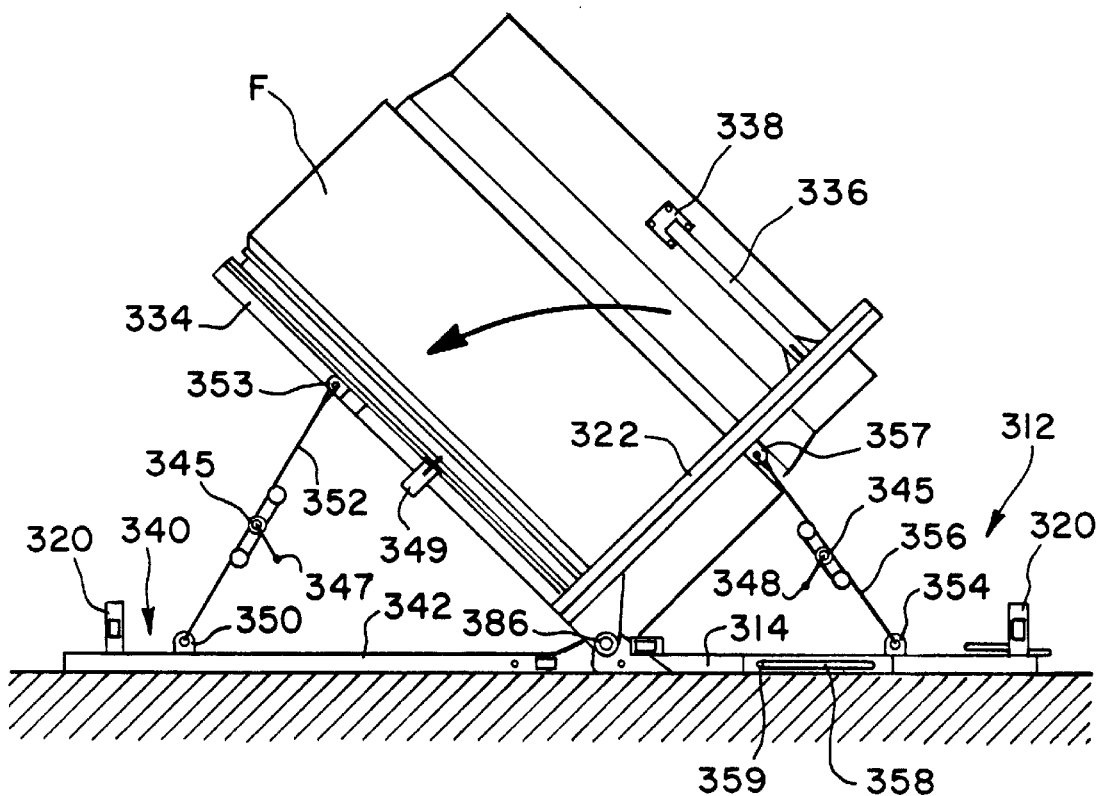
FIG. 34 is an elevation, as shown in FIG. 33, illustrating a pair of chain hoists being used to stabilize the loaded fan section when tipped from an upright or vertical position to a horizontal or tipped position.
Figure 35:
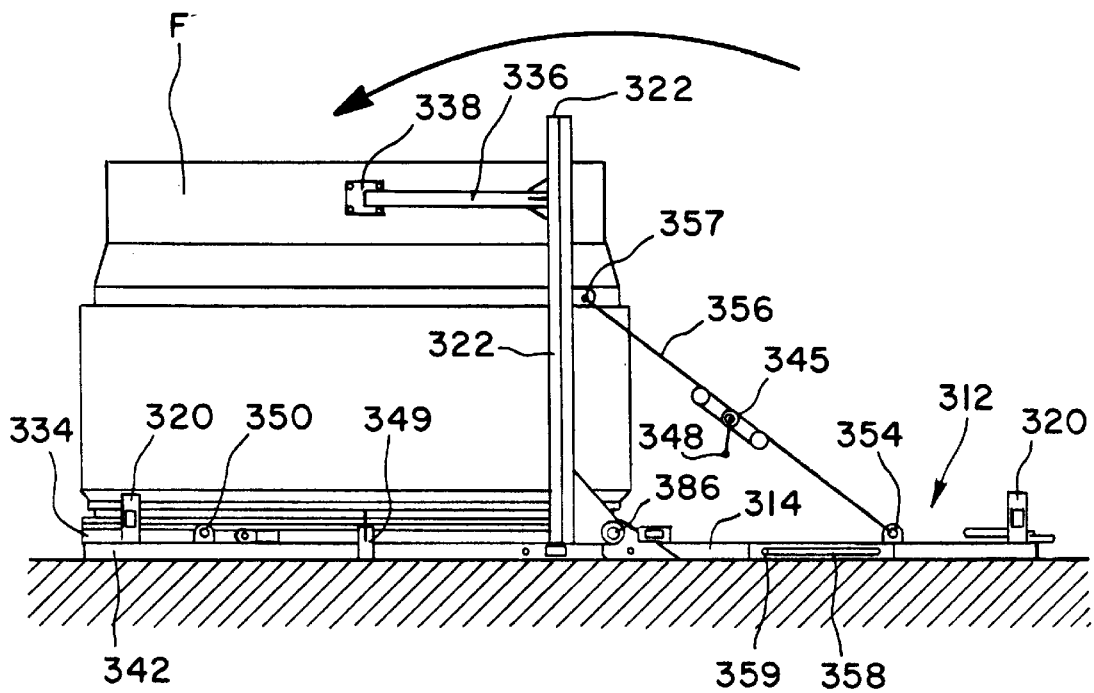
FIG. 35 is a side elevation, as shown in FIGS. 33 and 34, illustrating the fan section loaded on the fan shipping frame that has been completely rotated or tilted to the horizontal position.

Once stabilizers 336 have been reattached to the shipping frame 310, the shipping frame is prepared for rotation to the horizontal transport position if it is necessary to transport the fan section F on an aircraft such as a C130. As shown in FIG. 33, the rotating or tipping operation commences with deployment of the platform assembly 340. In accordance therewith, a pair of opposing chain hoists 345 and 346 with corresponding handles 347 and 348 are secured to the shipping frame and platform locks 349 may then be unlocked. Chain hoist 345 is secured between template bracket 334 and longitudinal bar 342 by means of a cable or chain 352 which attaches at opposing ends to platform retaining eye 350 and anchor point 353. The other chain hoist 346 is secured between longitudinal member 314 and rail member 322 by means of cable or chain 356 which attaches at opposing ends to frame retaining eye 354 and anchor point 357. Hand crank 347 of chain hoist 345 is manipulated to lower the platform assembly by means of corresponding chain 352. Hand crank 347 is manipulated until the platform assembly 340 rests on the ground. As shown in FIG. 33, caster assemblies 360 have been removed from the shipping frame 310. In most circumstances, it is desirable to remove the caster assemblies because, during the tipping operation, it is necessary that the shipping frame be in a completely stable and stationary position. As shown in FIG. 34, once platform assembly 340 has been deployed, fan section F may be rotated or tipped to the horizontal transport position. Accordingly, chain hoist 346 is manipulated by hand crank 348 to enable the deployment of chain 356 which, in turn, enables the fan section F to be tipped onto platform 342. Hinge mechanism 386 enables the fan section F to rotate from the vertical position to the horizontal position. However, because of the tremendous load placed on the hinge when the fan section F is halfway between the vertical and horizontal, it may be necessary to provide additional structural support to the hinge. Accordingly, a support bar (not shown) may be placed inside each longitudinal member 314 and slidable into the abutted longitudinal bar 342 when the fan section F is tipped. A longitudinal slot 358 may be formed in each longitudinal member 314 wherein a handle 359 attached to the support bar enables manipulation of the support bar into and out of longitudinal bar 342. Typically, the support bar may be inserted into longitudinal bar 342 so that approximately one-half of the support bar is positionable in both the longitudinal bar 342 and longitudinal member 314. As shown in FIG. 35, the fan section F is tipped completely to the horizontal position. In this configuration, it is now necessary to raise frame assembly 312 to a vertical position. Accordingly, hand crank 348 is again manipulated to draw in chain 356. Once the frame assembly is brought flush up against rail members 322, latch mechanisms (not shown) are activated to securely lock the frame assembly 312 in place.

Once the tipping or rotating operation is complete, caster assemblies 360 may be reattached to the pylons 320 located on platform assembly 340 enabling the fan section F to be transported in the horizontal position.

Although the above rotation procedure has been described in rotation of the fan section F from the vertical to the horizontal position, the above procedure can be reversed enabling the fan section F to be rotated from the horizontal to the vertical position. This reversed rotation may be necessary depending upon the type of aircraft(s) used to transport the fan section.

To be able to observe the amount of tension placed on chains 352 and 356, loading indicating devices such as dynamometers (not shown) may be placed in-line between the ends of chains 352 and 356 and their respective retaining eyes 350 and 354. This load indication ensures that one particular chain hoist is not under or overloaded which in turn ensures that there is a smooth rotation of the fan section F from the vertical to the horizontal or vice versa.

Figure 36:
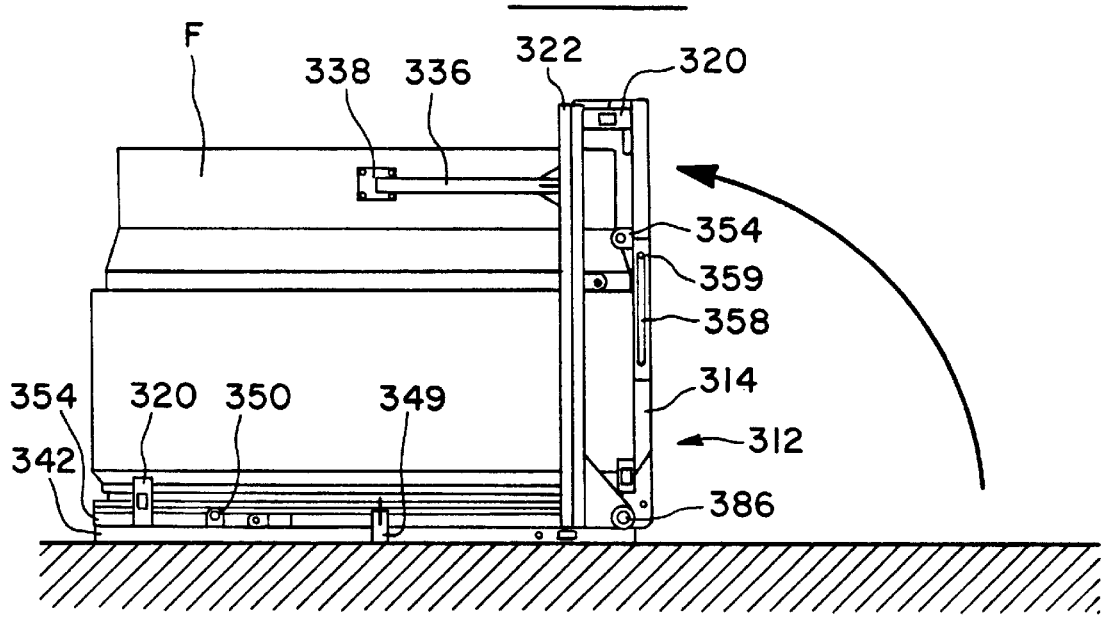
FIG. 36 is a side elevation, as shown in FIGS. 33–35, illustrating the frame assembly of the fan shipping frame reattached to the fan section.

Since FIGS. 33 and 36 are elevational views which only show one side of the apparatus, it will be understood that hoists 345 and 346 are each deployed in pairs, each pair positioned on opposing lateral sides of the shipping frame. Thus, four chain hoists may be used to tip the fan section F. Although chain hoists are illustrated in the preferred embodiment, it will be understood that other types of securing devices may be used such as ratchets or locking pulley systems.

This invention has been described in detail with reference to a particular embodiment thereof, but it will be understood that various other modifications can be effected within the spirit and scope of this invention.

We claim:

1. A method of removing the fan section of a jet aircraft engine from the aircraft engine having a longitudinal axis, said method comprising the steps of:

aligning a fan dolly with the fan section;

attaching the fan dolly to the fan section by means of an attaching assembly including means for measuring the amount of load placed upon the fan dolly by the fan section;

measuring the load placed on specific locations of the fan dolly by the fan section;

adjusting the load of the fan section by providing a plurality of cables which are adjustable by means of rachet devices;

distributing the load of the fan section on the fan dolly as necessary to provide a smooth removal of the fan section from the aircraft engine; and removing the fan section from the aircraft engine by pulling the fan section away from the jet aircraft engine wherein the fan dolly includes a train assembly enabling the fan section to be displaced precisely and horizontally on the fan dolly along the longitudinal axis.

2. A method, as claimed in claim 1, wherein said aligning step includes:

adjusting the height of the fan dolly to engage the fan section.

3. A method of removing the fan section of a jet aircraft engine from the aircraft engine having a longitudinal axis, said method comprising the steps of:

aligning a fan dolly with the fan section;

attaching the fan dolly to the fan section by means of an attaching assembly including means for measuring the amount of load placed upon the fan dolly by the fan section;

measuring the load placed on specific locations of the fan dolly by the fan section by means of dynamometers which are operatively coupled to the fan dolly at desired locations thereon;

distributing the load of the fan section on the fan dolly as necessary to provide a smooth removal of the fan section from the aircraft engine; and removing the fan section from the aircraft engine by pulling the fan section away from the jet aircraft engine wherein the fan dolly includes a train assembly enabling the fan section to be displaced precisely and horizontally on the fan dolly along the longitudinal axis.

* * * * *